United States Patent
Lubow et al.

(10) Patent No.: US 10,606,618 B2
(45) Date of Patent: Mar. 31, 2020

(54) CONTEXTUAL ASSISTANCE SYSTEM

(71) Applicant: ADP, LLC, Roseland, NJ (US)

(72) Inventors: Michael Lubow, Jersey City, NJ (US); Matthew Paul Herman, Hoboken, NJ (US); Hadar Yacobovitz, New York, NY (US); Jordan Schiffer, Brooklyn, NY (US); Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 573 days.

(21) Appl. No.: 15/000,886

(22) Filed: Jan. 19, 2016

(65) Prior Publication Data
US 2017/0206096 A1    Jul. 20, 2017

(51) Int. Cl.
| | | |
|---|---|---|
| *G06F 9/451* | (2018.01) | |
| *G06F 3/0481* | (2013.01) | |
| *G06F 17/24* | (2006.01) | |
| *G06F 16/957* | (2019.01) | |
| *G06T 13/00* | (2011.01) | |

(52) U.S. Cl.
CPC ............ *G06F 9/453* (2018.02); *G06F 3/0481* (2013.01); *G06F 16/9577* (2019.01); *G06F 17/243* (2013.01); *G06T 13/00* (2013.01)

(58) Field of Classification Search
CPC .. G06F 17/30896; G06F 3/0482; G06F 9/453; G06T 13/00
See application file for complete search history.

(56) References Cited

U.S. PATENT DOCUMENTS

| 5,377,319 A * | 12/1994 | Kitahara ............. G06F 3/04895 |
| | | 715/707 |
| 5,434,963 A | 7/1995 | Kuwamoto et al. |
| 5,546,521 A | 8/1996 | Martinez |
| 5,933,140 A * | 8/1999 | Strahorn ................. G06F 9/453 |
| | | 715/712 |

(Continued)

FOREIGN PATENT DOCUMENTS

WO    WO9837503 A1    8/1998

OTHER PUBLICATIONS

Sukaviriya et al., "Automatic Generation of Textual, Audio, and Animated Help in UIDE: The User Interface Design Environment," Georgia Institute of Technology, Graphics, Visualization & Usability Center Technical Report No. GIT-GVU-93-36, Sep. 1993, 10 pages.

*Primary Examiner* — Shen Shiau
(74) *Attorney, Agent, or Firm* — Yee & Associates, P.C.

(57) ABSTRACT

A method and apparatus for providing assistance for an application. The application runs in a web browser displayed on a display system for a client device. The application monitors for user input to the web browser. When assistance is needed for a location in the web page, the location is identified based on the user input. A graphical element with a portion of the web page at the location is generated. A group of audio files on how to use the application at the location is identified. The graphical element with the portion of the web page at the location is displayed on the display system. The audio files are played on the client device while the graphical element with the portion of the web page at the location of the web page is displayed. The audio files and the graphical element provide the assistance.

31 Claims, 16 Drawing Sheets

(56) References Cited

U.S. PATENT DOCUMENTS

| | | | |
|---|---|---|---|
| 6,020,886 A * | 2/2000 | Jacober | G06F 9/453 715/709 |
| 6,262,730 B1 | 7/2001 | Horvitz et al. | |
| 6,643,641 B1 * | 11/2003 | Snyder | G06F 16/951 707/709 |
| 6,717,589 B1 * | 4/2004 | Grillo | G06F 9/453 715/715 |
| 8,099,664 B2 | 1/2012 | Kureshy et al. | |
| 8,271,876 B2 * | 9/2012 | Brugler | G06F 9/453 715/708 |
| 9,148,456 B2 | 9/2015 | Vendrow et al. | |
| 2002/0130895 A1 * | 9/2002 | Brandt | G06F 9/453 715/708 |
| 2005/0268234 A1 * | 12/2005 | Rossi, Jr. | G06F 9/453 715/705 |
| 2007/0266311 A1 | 11/2007 | Westphal | |
| 2008/0301558 A1 * | 12/2008 | Najafi | G06F 9/453 715/708 |
| 2009/0031224 A1 * | 1/2009 | Budreau | G06F 3/0482 715/760 |
| 2010/0042573 A1 * | 2/2010 | Wenig | G06F 9/54 706/47 |
| 2010/0205530 A1 * | 8/2010 | Butin | G06F 9/453 715/715 |
| 2011/0131491 A1 * | 6/2011 | Lu | G06F 16/957 715/708 |
| 2011/0246880 A1 * | 10/2011 | Horton | G06F 9/453 715/708 |
| 2016/0342431 A1 * | 11/2016 | Huang | G06F 16/958 |

* cited by examiner

CONTEXTUAL ASSISTANCE SYSTEM

BACKGROUND INFORMATION

1. Field

The present disclosure relates generally to an improved computer system and, in particular, to a method and apparatus for providing assistance to users of the computer system. Still more particularly, the present disclosure relates to a method and apparatus for providing users assistance with applications running on a computer system.

2. Background

Applications are commonly run with a connection to the Internet. The applications may be used for different functions, such as e-mail, instant messaging, online retail sales, online auctions, payroll, benefits administration, financial transactions, report generation, and many other functions. These applications include, for example, web applications that run in browsers.

A web application is a server/client application in which the client runs on a web browser. Web applications are popular because of the widespread use of web browsers. The web browsers provide access to a server on the World Wide Web, which is also referred to just as the Web.

With web applications using a web browser as a client, updating and maintaining web applications may occur without distributing and installing software on client computers. Further, web applications may be used on different platforms. These web applications are considered online applications because they are able to connect to the World Wide Web, a local intranet, or some other network.

Assistance for online applications is provided in a number of different ways. For example, applications may have help topics, a frequently asked questions (FAQ) page, forums, a help desk, or online assistance.

Help topics and FAQ pages may be useful for many questions or issues that may arise in using a web application. However, a user may need assistance with an issue that is not found in the help topics or FAQ pages.

In this instance, forums may provide answers for issues that are not addressed by help topics or FAQ pages. Forums, however, may not provide an answer to a particular issue that a user has with an application. Additionally, forums also may be difficult to navigate or search for answers to issues that a user may have with an application.

Online assistance may include sending an e-mail message or filling out a request for assistance in an application. This type of process, however, often takes more time than desired. For example, a response to a message may not occur for an hour or a day. The user, however, in the meantime, is unable to perform a desired function or action using the application. As a result, the user may encounter delays in performing tasks using the application.

Online assistance may also include an ability to message a representative in real-time. This type of assistance may be helpful to the user and more quickly resolve an issue. Online assistance, however, has limits. Often times, the instructions provided through messaging may not be as clear as desired to allow the user to resolve the issue. For example, instructions on how to navigate through an application to change settings, perform a desired function, or some other action may be hard to understand through text.

In some cases, online assistance may involve allowing the representative to remotely take control of the computer or device in which the user is located. This type of remote assistance may be unavailable in some organizations because of security concerns.

Further, live online assistance through messaging remote assistance may be more time-consuming and costly than desired. Also, depending on the need for assistance, access to a live representative may not be available when desired.

Therefore, it would be desirable to have a method and apparatus that take into account at least some of the issues discussed above, as well as other possible issues. For example, it would be desirable to have a method and apparatus that overcome a technical problem with obtaining assistance with an issue for an application as quickly as desired.

SUMMARY

An embodiment of the present disclosure provides a method for providing assistance for an application. The method comprises monitoring for a user input to a web page for the application running in a web browser displayed on a display system for a client device by a computer system. Further, the method comprises identifying when the assistance is needed for a location in the web page for the application based on the user input to the web page by the computer system. Yet further, the method comprises generating a graphical element with a portion of the web page at the location by the computer system. Still further, the method comprises identifying a group of audio files on how to use the application at the location by the computer system. Still yet further, the method comprises displaying the graphical element with the portion of the web page at the location on the display system by the computer system. Still further, the method comprises playing the audio file on the client device while the graphical element with the portion of the web page at the location of the web page is displayed on the display system by the computer system, wherein the audio file and the graphical element with the portion of the web page at the location provide the assistance.

Another embodiment of the present disclosure provides a computer system. The computer system comprises an assistance manager that monitors for a user input to a web page for an application running in a web browser displayed on a display system for a client device. Further, the assistance manager identifies when assistance is needed for a location in the web page for the application based on the user input to the web page. Yet further, the assistance manager generates a graphical element with a portion of the web page at the location. Still further, the assistance manager identifies a group of audio files on how to use the application at the location. Still yet further, the assistance manager displays the graphical element with the portion of the web page at the location on the display system. Still further, the assistance manager plays the audio file on the client device while the graphical element with the portion of the web page at the location of the web page is displayed on the display system, wherein the audio file and the graphical element with the portion of the web page at the location provide the assistance.

Yet another embodiment of the present disclosure provides a computer program product for providing assistance for an application. The computer program product comprises a computer readable storage media, first program code, second program code, third program code, fourth program code, fifth program code, and sixth program code. The first program code, the second program code, the third program code, the fourth program code, the fifth program code, and the sixth program code are stored on the computer readable storage media. The first program code monitors for a user input to a web page for the application running in a web browser displayed on a display system for a client device. The second program code identifies when assistance is needed for a location in the web page for the application based on the user input to the web page. The third program code generates a graphical element with a portion of the web page at the location. The fourth program code identifies a group of audio files on how to use the application at the location. The fifth program code displays the graphical element with the portion of the web page at the location on the display system. The sixth program code plays the audio file on the client device while the graphical element with the portion of the web page at the location of the web page is displayed on the display system, wherein the audio file and the graphical element with the portion of the web page at the location provide the assistance.

Still another embodiment of the present disclosure provides a method for providing assistance for an application. The method comprises monitoring, by a computer system, for a user input to the application running displayed on a display system for a client device. Further, the method comprises identifying, by the computer system, when the assistance is needed for a location in the application based on the user input to the application. Yet further, the method comprises generating, by the computer system, an animation that presents the assistance on how to use the application at the location identified as needing the assistance. Still further, the method comprises displaying, by the computer system, the animation in a window for the application on the display system, wherein the assistance is provided by the animation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 4 is an illustration of an application in accordance with an illustrative embodiment;

FIG. 7 is an illustration of an application in accordance with an illustrative embodiment;

FIG. 8 is an illustration of assistance for an application in accordance with an illustrative embodiment;

DETAILED DESCRIPTION

The illustrative embodiments recognize and take into account one or more different considerations. For example, the illustrative embodiments recognize and take into account that an increased speed at which a user can obtain assistance for an issue is desirable. Further, the illustrative embodiments recognize and take into account that, in addition to providing access more quickly, an ability to provide assistance that resolves an issue is also desirable. The illustrative embodiments also recognize and take into account that providing this type of assistance without increasing the need for live operators being online is desirable.

The illustrative embodiments recognize and take into account that one manner in which assistance may be provided is through videos. The illustrative embodiments also recognize and take into account that videos with audio instructions are often useful in demonstrating how to use an application. The illustrative embodiments recognize and take into account, however, that these videos may be difficult to find and require the user of the application to search for them in a depository, such as a video sharing website. Further, the illustrative embodiments recognize and take into account that the organization providing support for the application may maintain a repository of videos. The illustrative embodiments recognize and take into account, however, that this repository may require more resources than desired. For example, a repository for videos uses resources, such as storage, bandwidth for delivery, and other resources.

Thus, the illustrative embodiments provide a method and apparatus for providing online assistance to users of applications. In one illustrative example, a method for providing assistance for an application is present. A computer system monitors for a user input to a web page for the application running in a web browser displayed in a display system for a client device. The computer system identifies when the assistance is needed for a location in the web page for the application based on the user input to the web page. The computer system generates a graphical element that presents assistance on how to use the application at the location identified as needing the assistance. The process also identifies a group of audio files that describe how to use the application at the location. The graphical element is displayed by the computer system in a window in the web browser for the application on the display system for the client device with the group of audio files being played by the computer system, wherein the assistance is provided by the graphical element and the group of audio files.

Figure 1:
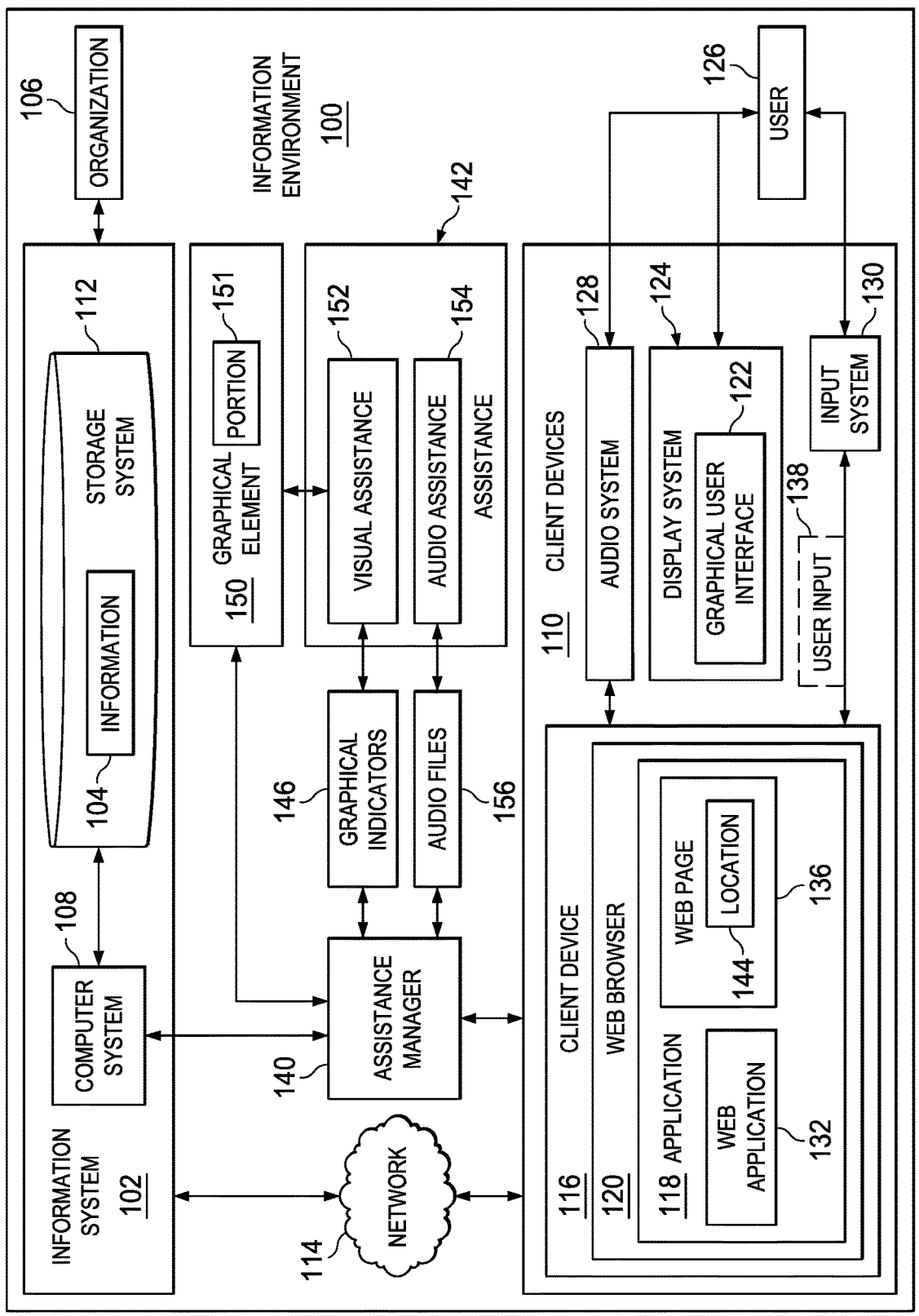
FIG. 1 is a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charity, a city, a government agency, or some other suitable type of organization. Information 104 about organization 106 may include, for example, at least one of information about people, products, benefits, payroll, research, product analysis, business plans, financials, or some other information relating to organization 106.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

Information system 102 may be selected from one of an employee information system, a research information system, a sales information system, an accounting system, a payroll system, or some other type of information system that stores and provides access to information 104 about organization 106. As depicted, information system 102 includes computer system 108 through which client devices 110 may access information 104. In this illustrative example, information 104 may be located in storage system 112 for computer system 108. The access may include at least one of reading, writing, modifying, or operating on information 104. Client devices 110 may communicate with computer system 108 through network 114.

As depicted, computer system 108 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

In this illustrative example, client devices 110 are physical hardware in the form of data processing systems that may be selected from at least one of a desktop computer, a laptop computer, a mobile phone, a kiosk, a tablet, or some other suitable type of data processing system. As depicted, client device 116 in client devices 110 runs application 118 in web browser 120 displayed in graphical user interface 122 on display system 124 for client device 116. Output from client device 116 may be heard by user 126 through audio system 128 for client device 116, in addition to being displayed on display system 124.

Client device 116 is a physical hardware system. Client device 116 may be selected from one of a personal computer, a workstation, a kiosk, a laptop computer, a mobile phone, a tablet computer, a game console, or some other suitable type of data processing system.

As depicted, display system 124 is a physical hardware system and includes one or more display devices. The display devices may include at least one of a light emitting diode (LED) display, a liquid crystal display (LCD), an organic light emitting diode (OLED) display, or some other suitable display device. Audio system 128 is a hardware system that generates sound and may include one or more devices that generate sound. For example, audio system 128 may include one or more speakers.

User 126 is a human being who interacts with application 118 through input system 130. As depicted, input system 130 is a physical hardware system and includes at least one of a mouse, a keyboard, a trackball, a touchscreen, a stylus, a motion sensing input device, a cyberglove, or some other suitable type of input device.

As depicted, web browser 120 is a software application that performs at least one of retrieving, presenting, or traversing information that may be found in resources on the World Wide Web. Although web browser 120 is typically used to access information on the World Wide Web, web browser 120 also may be used to access information on web servers in private networks or in file systems.

In this illustrative example, application 118 in web browser 120 running on client device 116 is web application 132 that accesses information 104. As depicted, application 118 includes web page 136. User 126 may generate user input 138 through input system 130 into web page 136 in interacting with application 118.

Web page 136 is a document for application 118 that may be displayed on web browser 120. Web page 136 is a file or other data structure that can be displayed by web browser 120 on display system 124. Web page 136 may be, for example, a static web page or a dynamic web page in this illustrative example.

Web application 132 is also referred to as an online application. Web application 132 is an application in which some or all parts of the application are downloaded each time the application is run.

Although described as web application 132 in this example, application 118 may be implemented in other forms in other illustrative examples. For example, application 118 may be an application for a mobile phone downloaded from a digital distribution platform that distributes applications to mobile phones, tablet computers, or other similar devices. These types of applications may also be referred to as native applications. Native applications take advantage of features found on a mobile phone. For example, a native application may access information from a global positioning system unit, an accelerometer, or some other hardware or software components on the mobile phone. Additionally, native applications may also include components for accessing web content without using a web browser. For example, web application 132 may include components to interact with a server on the Web using standard web protocols.

In yet another illustrative example, application 118 may be an application that runs on a mobile phone. This application may be a hybrid in which the application has an integrated web browser or has access to the already present web browser on the mobile phone.

Application 118 may perform one or more different functions. For example, application 118 may be selected from at least one of an accounting application, a human resources application, a benefits administration program, a database application, or some other type of application. In these different forms, application 118 has a connection to network 114, such as the Internet. In this manner, application 118 is an online application when application 118 has the capability of connecting to the Internet or some other network to obtain content or communicate with other applications, programs, or services on other data processing systems.

As depicted, when using application 118, user 126 may encounter difficulty in using application 118. For example, user 126 may have difficulty entering data into fields on web page 136. As another example, user 126 may have difficulty in making selections from options provided on web page 136.

In this illustrative example, assistance manager 140 provides assistance for application 118 to user 126. Assistance manager 140 may be implemented in software, hardware, firmware, or a combination thereof. When software is used, the operations performed by assistance manager 140 may be implemented in program code configured to be loaded and run on hardware, such as a processor unit. When firmware is used, the operations performed by assistance manager 140 may be implemented in program code and data and stored in persistent memory to run on a processor unit. When hardware is employed, the hardware may include circuits that operate to perform the operations in assistance manager 140.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In the illustrative example, assistance manager 140 is part of application 118. In other examples, assistance manager 140 may be a plug-in for web browser 120 or some other component that is part of or separate from web browser 120.

As depicted, assistance manager 140 monitors for user input 138 to web page 136 for application 118 running in web browser 120 displayed on display system 124 for client device 116. Assistance manager 140 identifies when assistance 142 is needed by analyzing user 126 for location 144 in application 118 and, in particular, location 144 on web page 136 for application 118. In other words, assistance manager 140 identifies when assistance 142 is needed for location 144 in web page 136 for application 118 based on user input 138 to web page 136.

As depicted, location 144 includes at least one of a text box, a check box, a drop-down menu, a region, or some other element in web page 136 for application 118 where user input 138 may be made. The region in location 144 may include multiple graphical elements that receive user input. For example, the region may include three check boxes, a text box and a checkbox, or some other combination of graphical elements in which user input 138 may be entered into application 118 through web page 136.

Assistance manager 140 generates graphical element 150 in which portion 151 of web page 136 may be displayed. Assistance manager 140 displays graphical element 150 with portion 151 of web page 136 on display system 124. Graphical element 150 is displayed for application 118 in web browser 120. In other illustrative examples, graphical element 150 may be a separate component from web browser 120. Graphical element 150 may be, for example, a window, a tooltip, a pop-up window, a modal window, an in-line element, or any other type of graphical element in which a group of graphical indicators 146 may be displayed.

In this manner, assistance 142 is provided by graphical element 150 with portion 151. Graphical element 150 with portion 151 visually focuses the tension of user 126. For example, graphical element 150 with portion 151 may focus the attention of user 126 to location 144 in web page 136. As depicted, graphical element 150 with portion 151 is visual assistance 152 in assistance 142.

In the illustrative example, assistance 142 also includes audio assistance 154. Assistance manager 140 identifies a group of audio files 156 on how to use application 118 at location 144. As depicted, the group of audio files 156 provides audio assistance 154 in the form of verbal assistance or instructions on how to use application 118 at location 144.

Assistance manager 140 may play the group of audio files 156 on client device 116 through audio system 128 in conjunction with the display in graphical element 150 in web browser 120 for application 118 on display system 124. In this manner, graphical element 150 and the group of audio files 156 provide assistance 142 in a form of instructions on how user input 138 should be made to location 144. In other words, the group of audio files 156 is displayed in a manner that is coordinated with location 144 when displayed in graphical element 150.

Additionally, assistance manager 140 may generate a group of graphical indicators 146 that is displayed in graphical element 150 with portion 151 of web page 136. The group of graphical indicators 146 may aid in presenting assistance 142 on how to use application 118 at location 144 identified as needing assistance 142. The group of graphical indicators 146 provides additional visualization in visual assistance 152 in addition to graphical element 150.

As depicted, a group of graphical indicators 146 may take different forms. For example, the group of graphical indicators 146 may include at least one of highlighting, a color, an icon, an animation, underlining, bolding, italics, a font size, a font type, or other suitable types of graphical indicators that may serve to obtain the attention of user 126, aid in providing visual assistance 152 on how to use application 118, or some combination thereof.

In one illustrative example, one or more technical solutions are present that overcome a technical problem with obtaining assistance with an issue for an application as quickly as desired. As a result, one or more technical solutions may provide a technical effect in which assistance 142 is provided for application 118 that addresses how to use application 118 in a particular location where user 126 may be having difficulties.

As a result, computer system 108 operates as a special purpose computer system in which assistance manager 140 in computer system 108 enables providing assistance 142 that is directed to an issue that user 126 may have at a particular location in application 118. In particular, assistance manager 140 transforms computer system 108 into a special purpose computer system as compared to currently available general computer systems that do not have assistance manager 140.

For example, computer system 108 with assistance manager 140 provides a visualization of assistance 142 in graphical user interface 122 on display system 124. This visualization is provided in a manner that addresses an issue that user 126 may have in using application 118. For example, assistance 142 may give directions on entering information on web page 136 for web application 132 at location 144. Additionally, computer system 108 with assistance manager 140 may provide audio assistance 154 as part of assistance 142 that may be heard by user 126 in conjunction with the visualization of assistance 142.

Assistance 142 is provided without user 126 having to open another browser, window, application, or other resource. Assistance 142 is provided as part of application 118. Additionally, assistance manager 140 reduces the need for having live online assistance.

Additionally, assistance manager 140 also reduces the frustration of obtaining information by having to search a forum, send an e-mail message, fill out a form, or some other type of assistance that requires more time and effort than desired when user 126 is working to complete a task or operation using application 118 and is unable to complete the task or operation without assistance 142. For example, user 126 may be completing application information for a loan, changing benefits, performing a trade, or some other task or operation. The time involved with having to interrupt or halt the operation and search for information about the application may be reduced with assistance manager 140.

Figure 2:
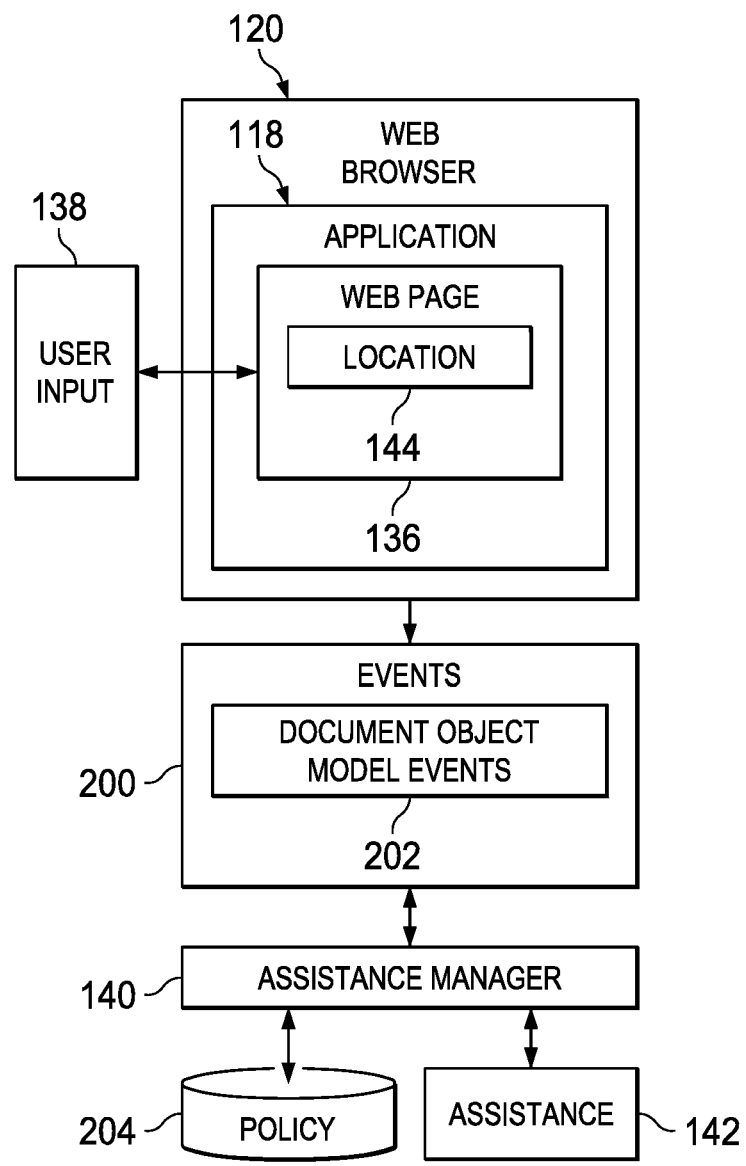
FIG. 2 is a data flow diagram for monitoring user input to determine when assistance is needed in accordance with an illustrative embodiment.

With reference to FIG. 2, a data flow diagram for monitoring user input to determine when assistance is needed is depicted in accordance with an illustrative embodiment. In the illustrative examples, the same reference numeral may be used in more than one figure. This reuse of a reference numeral in different figures represents the same element in the different figures.

As depicted, assistance manager 140 monitors web page 144 in application 118 for user input 138 to determine whether assistance 142 is needed for application 118. In this illustrative example, application 118 runs in web browser 120 displayed on display system 124 for client device 116.

In this illustrative example, the monitoring is an indirect monitoring of user input 138. In other illustrative examples, user input 138 may be monitored directly as generated by input system 130 shown in block form in FIG. 1.

As depicted, assistance manager 140 monitors user input 138. For example, assistance manager 140 may be implemented as part of application 118 that monitors activity on web browser 120. The activity may be user input 138.

For example, user input 138 is monitored indirectly through monitoring events 200 generated by user input 138 made to web page 136 for application 118 running in web browser 120. In this illustrative example, web browser 120 generates events 200.

As depicted, events 200 are document object model events 202. Assistance manager 140 may include JavaScript that is configured to monitor document object model events 202. Document object model events 202 in this illustrative example are selected from at least one of a mouse event, a keyboard event, a touchscreen event, a device event, or some other suitable type of event.

Assistance manager 140 uses events 200 to identify location 144 for user input 138. In other words, location 144 is where user input 138 has been made.

Further, assistance manager 140 determines whether assistance 142 is needed for location 144 in application 118. Location 144 may be a location selected by user 126, shown in block form in FIG. 1, to enter information into application 118. For example, when application 118 is web application 132, shown in block form in FIG. 1, location 144 may be a text box, a drop-down menu, a check box, or some other region in web page 136.

The determination of whether assistance 142 is needed for location 144 based on user input 138 may be identified by assistance manager 140 applying policy 204 to events 200. Policy 204 is a group of rules that define when assistance 142 is needed for a particular location. As used herein, "a group of", when used with reference to items, means one or more items. For example, "a group of rules" is one or more rules.

For example, a rule in policy 204 may indicate that assistance is needed when events 200 is an incorrect user input to a text box at location 144 that occurs greater than some threshold number of times. If user 126, shown in block form in FIG. 1, enters incorrect information more than the threshold number of times, user 126 may be considered to be having difficulty and possibly needs assistance 142 with application 118.

As another example, assistance manager 140 may monitor how long user 126 has been in the text box without completing the entry of the information into the text box at location 144. Another rule in policy 204 may indicate that assistance 142 is needed when user 126 has selected a text box in location 144, but has not entered information for a period of time that is greater than some threshold amount of time. As depicted, assistance manager 140 may include JavaScript that is configured to monitor document object model events 202.

These examples of rules are not meant to limit the rules that may be implemented in policy 204. Other types of rules may be implemented in policy 204 other than a period of time for a number of incorrect entries, depending on the particular implementation.

Figure 3:
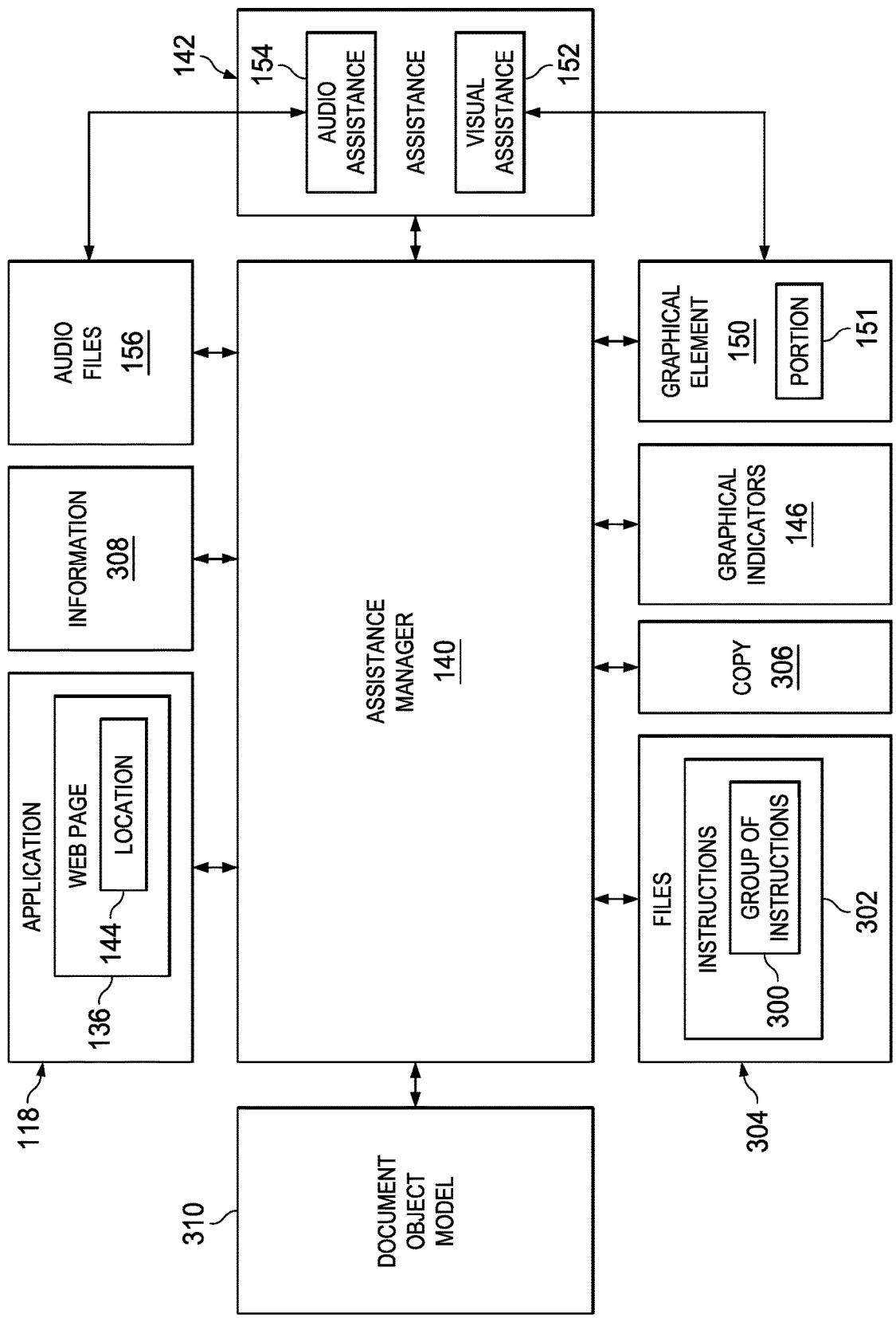
FIG. 3 is a data flow diagram for generating assistance for an issue at a location and an application in accordance with an illustrative embodiment.

Turning now to FIG. 3, a data flow diagram for generating assistance for an issue at a location and an application is depicted in accordance with an illustrative embodiment. In this illustrative example, assistance manager 140 generates assistance 142.

As depicted, assistance manager 140 identifies group of instructions 300 in instructions 302 for creating assistance 142 for location 144. Each location may have a different group of instructions 300 in instructions 302 that are selected for each particular location. In some cases, more than one location 144 in application 118 may be associated with the same group of instructions 300. In the illustrative example, group of instructions 300 in instructions 302 may be created using a visual programming language or any other suitable type of programming language.

As depicted, instructions 302 may be stored in files 304 such that each group of instructions 300 in instructions 302 is located in a file. In other illustrative examples, instructions 302 may be stored as a single file or other type of data structure.

Assistance manager 140 identifies web page 136 for which assistance 142 is needed. Assistance manager 140 generates copy 306 of web page 136 and information 308 entered into web page 136. Assistance manager 140 uses copy 306 and group of instructions 300 to generate graphical element 150 with portion 151 of web page 136 as visual assistance 152. In this example, graphical element 150 may display one or more locations within portion 151 of web page 136. The panning or movement to different locations in portion 151 may be used to bring attention of user 126, shown in block form in FIG. 1, to location 144 or other locations in web page 136. For example, portion 151 is displayed in a manner that focuses the attention of user 126 to location 144 while the group of audio files 156 are played to provide assistance 142 on how to use application 118 at location 144. As depicted, portion 151 of web page 136 may be part or all of web page 136, depending on the particular implementation.

In this illustrative example, copy 306 may only include web page 136 and exclude information 308, depending on the implementation. Copy 306 is obtained from document object model 310 in this illustrative example.

Document object model (DOM) 310 organizes content for web page 136 into nodes and also contains information 308 entered into web page 136. Document object model 310 is a cross-platform and language independent convention for representing and interacting with objects in markup languages, such as hypertext markup language (HTML), extensible hypertext markup language (XHTML), and extensible markup language (XML) documents.

Additionally, assistance manager 140 may also identify a group of audio files 156. The identification of the group of audio files 156 is made based on location 144. For example, each audio file in audio files 156 may be associated with a particular location in application 118 or with a different group of instructions 300 in instructions 302. In some cases, the same audio file may be associated with more than one location in application 118. The group of audio files 156 identified for location 144 is audio assistance 154 for location 144. As depicted, the group of audio files 156 contains verbal instructions about location 144 for which user 126 may need assistance 142.

The illustration of information environment 100 and the different components in information environment 100 shown in block form in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, assistance manager 140 is shown as a component interacting with computer system 108 and client devices 110. As depicted, assistance manager 140 may be in client devices 110, computer system 108, or some combination thereof. For example, assistance manager 140 may include one or more components that run on client devices 110 in one or more components that run on computer system 108. These components may be client/server components.

For example, a first component in assistance manager 140 may be located on client device 116 and identify when assistance 142 is needed for location 144 for application 118. A second component in assistance manager 140 may be located in computer system 108, generate graphical element 150, and identify the group of audio files 156.

In yet another illustrative example, the group of audio files 156 may include text. The text in the group of audio files 156 may be converted to speech for audio assistance 154. For example, a speech synthesis process may be used to convert written text in the group of audio files 156 into human speech. In another illustrative example, the text may be associated with or as part of instructions 302 in FIG. 3.

In still another illustrative example, the group of graphical indicators 146 and the group of audio files 156 may form a multimedia animation in which audio assistance 154 is included as part of the group of graphical indicators 146 displayed in graphical element 150.

In yet another illustrative example, the group of audio files 156 may also include audio assistance 154 for other locations in web page 136 in addition to or in place of location 144. In other words, assistance 142 may be provided for multiple locations in web page 136.

For example, graphical element 150 may be a frame. Graphical element 150 displays different portions of web page 136 to show different locations at which assistance 142 is needed. With this example, the group of audio files 156 may provide audio assistance 154 for each of the different locations. In other words, each audio file in the group of audio files 156 may correspond to a particular location.

Figure 4:
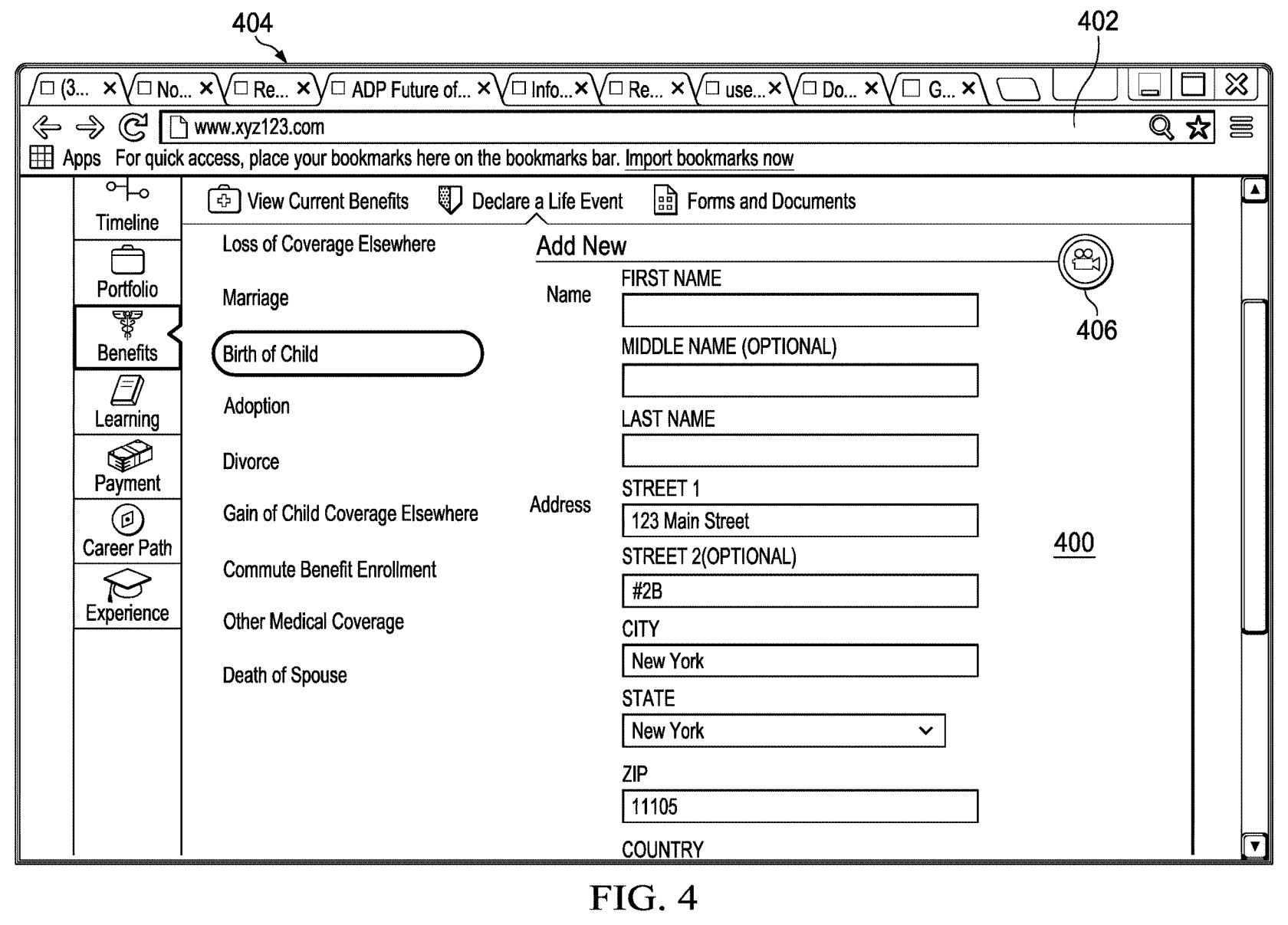

With reference now to FIGS. 4-7, illustrations of a process for obtaining assistance for an application are depicted in accordance with illustrative embodiments. With reference first to FIG. 4, an illustration of an application is depicted in accordance with an illustrative embodiment.

In this depicted example, web page 400 is for application 402 in web browser 404. Application 402 is an employee benefits application.

As depicted, web page 400, application 402, and web browser 404 are graphical representations of software and information for web page 136, application 118, and web browser 120 shown in block form in FIG. 1. The graphic representations of these figures are displayed in display system 124 for client device 116 shown in block form in FIG. 1 in this illustrative example.

Help indicator 406 is displayed within web page 400. As depicted, help indicator 406 is a graphical indicator that indicates that assistance is available for the birth of a child in this particular example. In this example, the location is all of web page 400. In other words, the assistance is in the form of an overview of web page 400.

In this particular example, help indicator 406 is displayed when the user reaches web page 400. In another illustrative example, help indicator 406 may be displayed when an event occurs. For example, the event may be when the user does not enter any user input into web page 400 for some period of time, when the user does not submit information entered into web page 400, or some other similar event.

In the illustrative example, help indicator 406 is selectable by user input to initiate the presentation of assistance for this location in application 402. The location for assistance is all of web page 400 in this depicted example.

Figure 5:
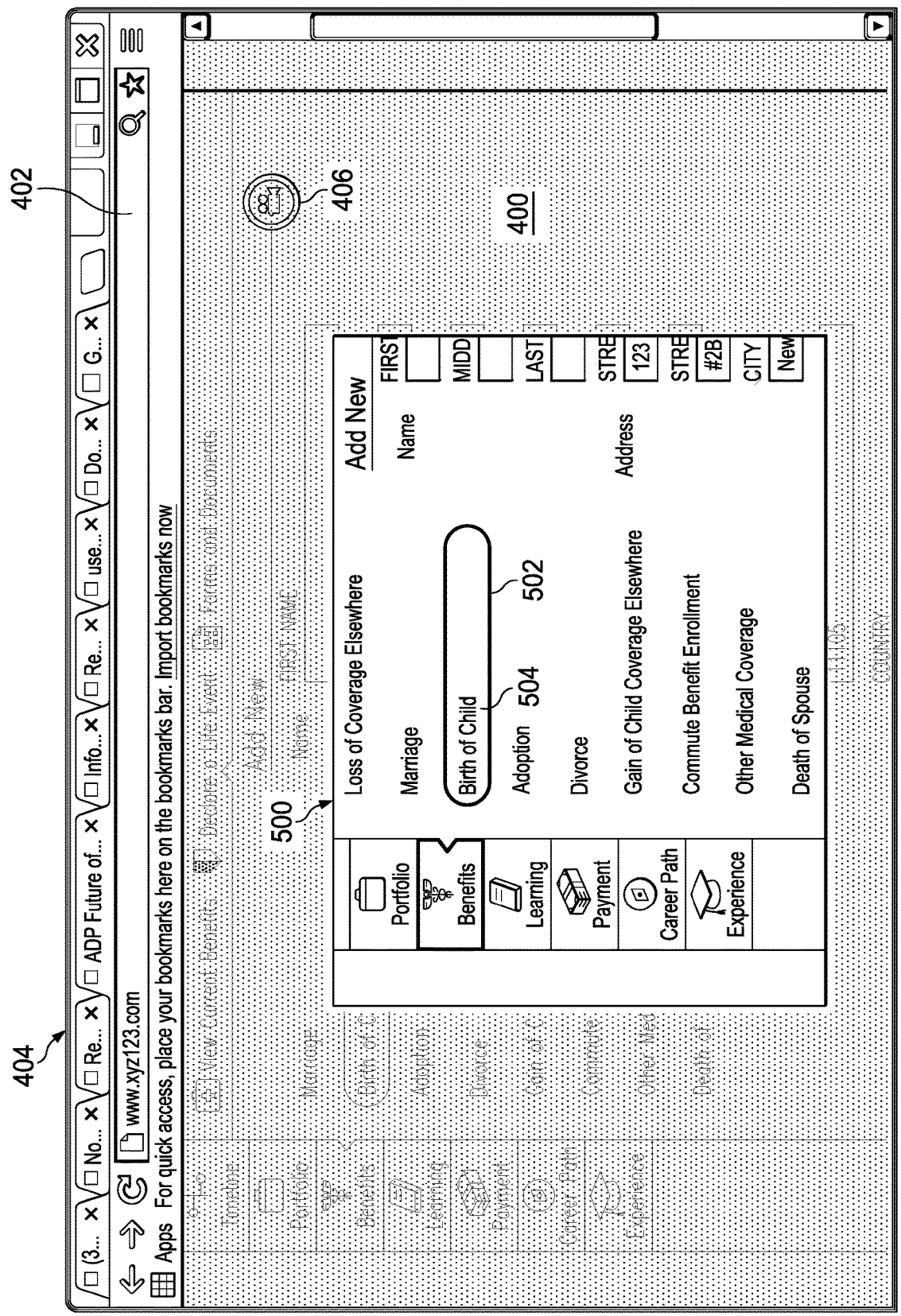
FIG. 5 is an illustration of assistance for an application in accordance with an illustrative embodiment.

With reference next to FIG. 5, an illustration of assistance for an application is depicted in accordance with an illustrative embodiment. As depicted, window 500 is displayed on web page 400. Window 500 is an example of graphical element 150 shown in block form in FIG. 1. Window 500 is generated by an assistance manager, such as assistance manager 140 shown in block form in FIG. 1.

In this illustrative example, window 500 is visual assistance for application 402. Window 500 may show a location in a portion of web page 400. For example, window 500 may focus the attention of a user to a particular location in web page 400.

In this illustrative example, window 500 may zoom in on portions of web page 400 and pan to draw attention to one or more locations in web page 400. As depicted, a group of graphical indicators may also be included as an example of visual assistance. For example, highlighting 502 is a graphical indicator that focuses attention to "Birth of Child" 504 on web page 400. In addition to or in place of highlighting 502, the group of graphical indicators may include at least one of flashing text, animation, bolding, font size showing example entries for user input, or other suitable visual information that may be displayed.

Window 500 in this illustrative example shows a portion of web page 400. Window 500 may also include examples based off of information entered into web page 400.

Additionally, audio assistance also is presented. The audio assistance is comprised of verbal instructions on how to input information into web page 400.

Figure 6:
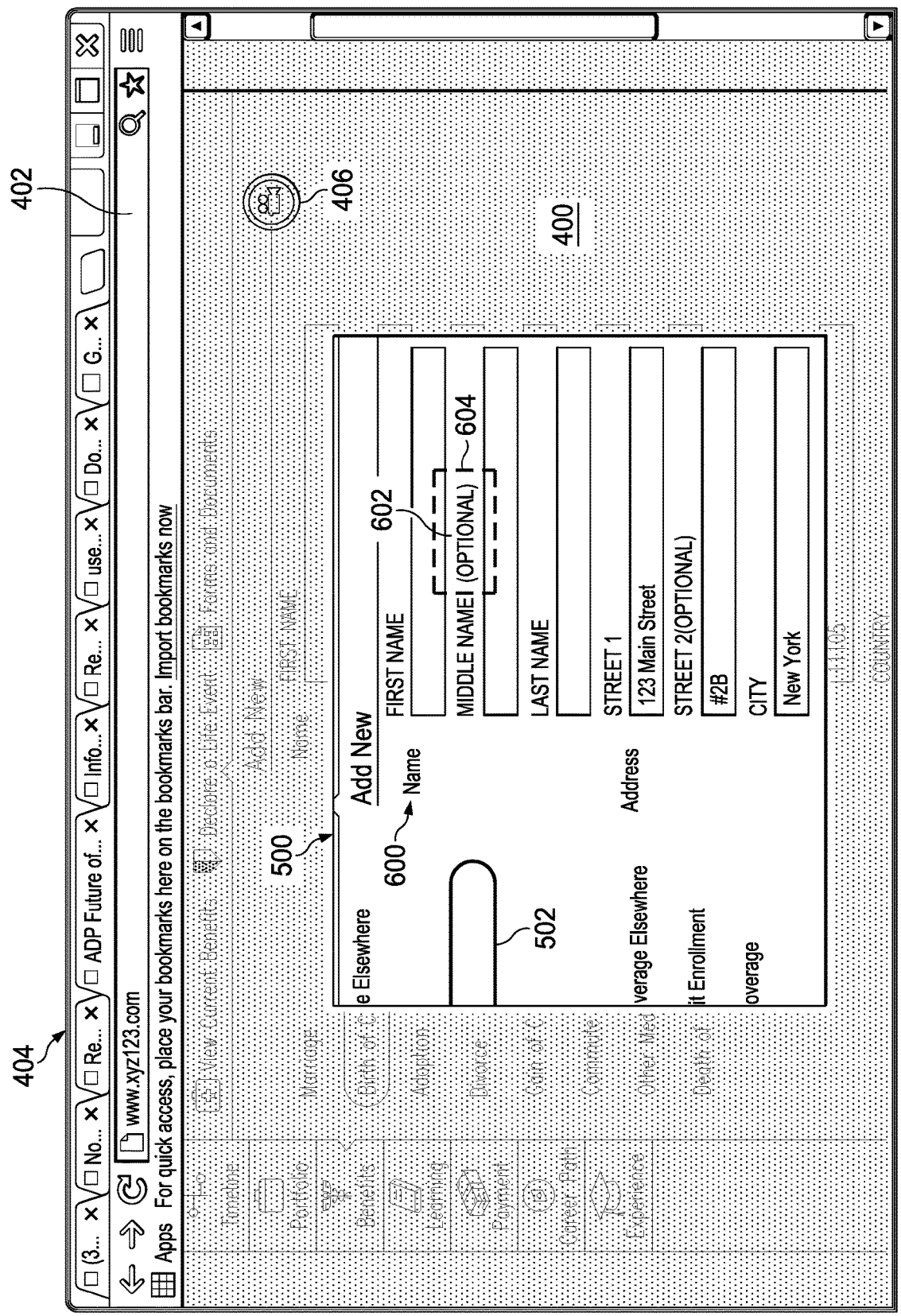
FIG. 6 is an illustration of assistance for an application in accordance with an illustrative embodiment.

With reference next to FIG. 6, an illustration of assistance for an application is depicted in accordance with an illustrative embodiment. In this illustration, window 500 zooms in and pans to the location containing the section called "Name" 600. The group of graphical indicators provides assistance in entering information into "Name" 600.

In this example, attention is focused to "Optional" 602 by highlighting 604. As depicted, highlighting 604 for "Optional" 602 helps draw the attention of the user to the instruction that a middle name is optional when entering information into "Name" 600.

Additionally, audio assistance in the form of verbal instructions is also presented to describe what information should be placed into the different fields at this location in the portion of web page 400 that is displayed. For example, the audio assistance includes verbal instructions explaining that a middle name is optional.

Figure 7:
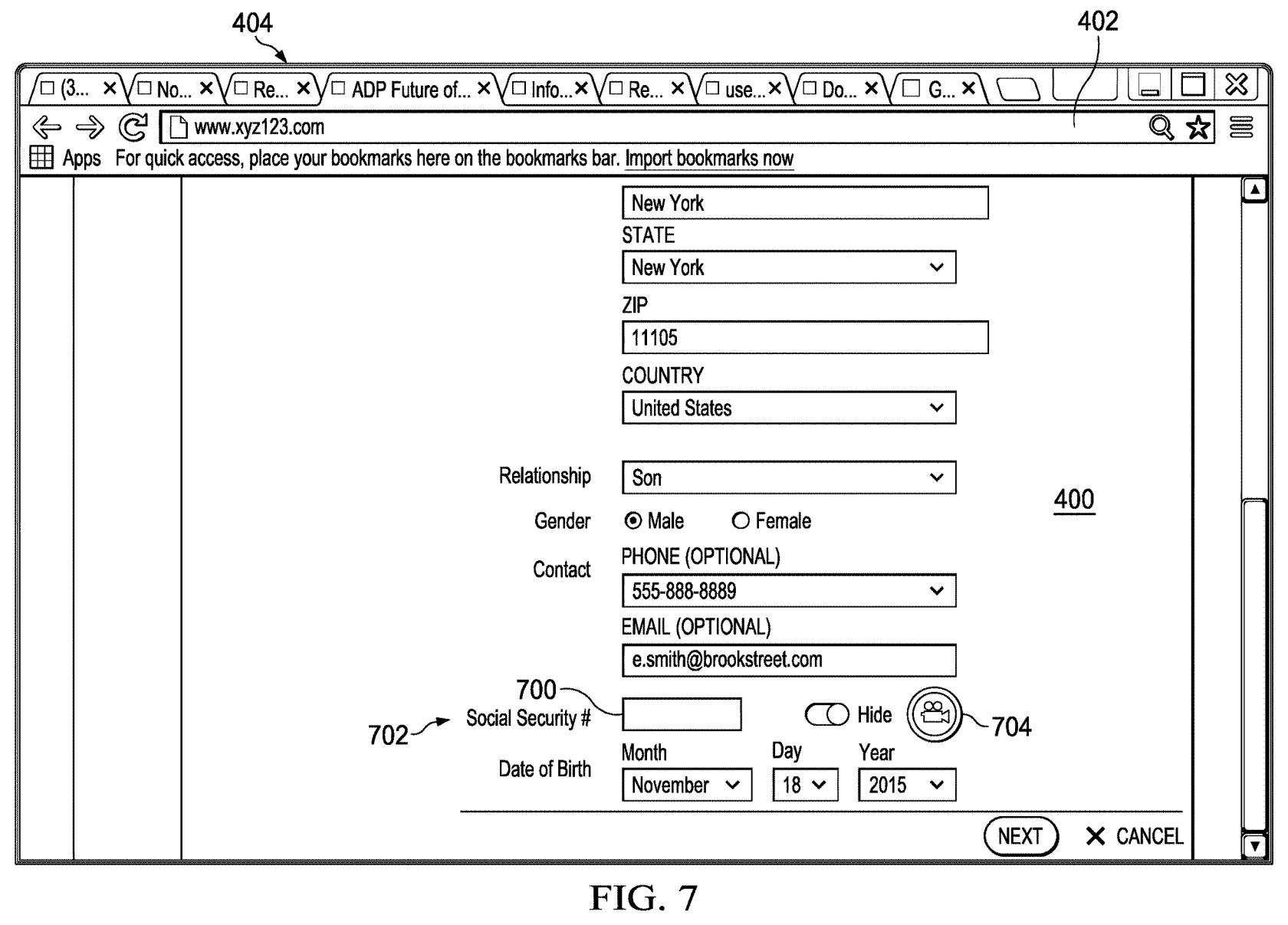

With reference next to FIG. 7, an illustration of an application is depicted in accordance with an illustrative embodiment. In this illustrative example, the user input selects text box 700 in the section called "Social Security #" 702 in web page 400 in application 402 in web browser 404. The user, however, has not entered information into text box 700 for the section called "Social Security #" 702. In this illustrative example, a period of time passes without information being entered, and a determination has been made that the user needs assistance for the location, text box 700.

As depicted, help indicator 704 is displayed in association with text box 700. In this illustrative example, help indicator 704 is not displayed until a period of time passes without the user entering information into text box 700. Help indicator 704 may be selected by the user to initiate the presentation of visual assistance and audio assistance for "Social Security #" 702.

Figure 8:
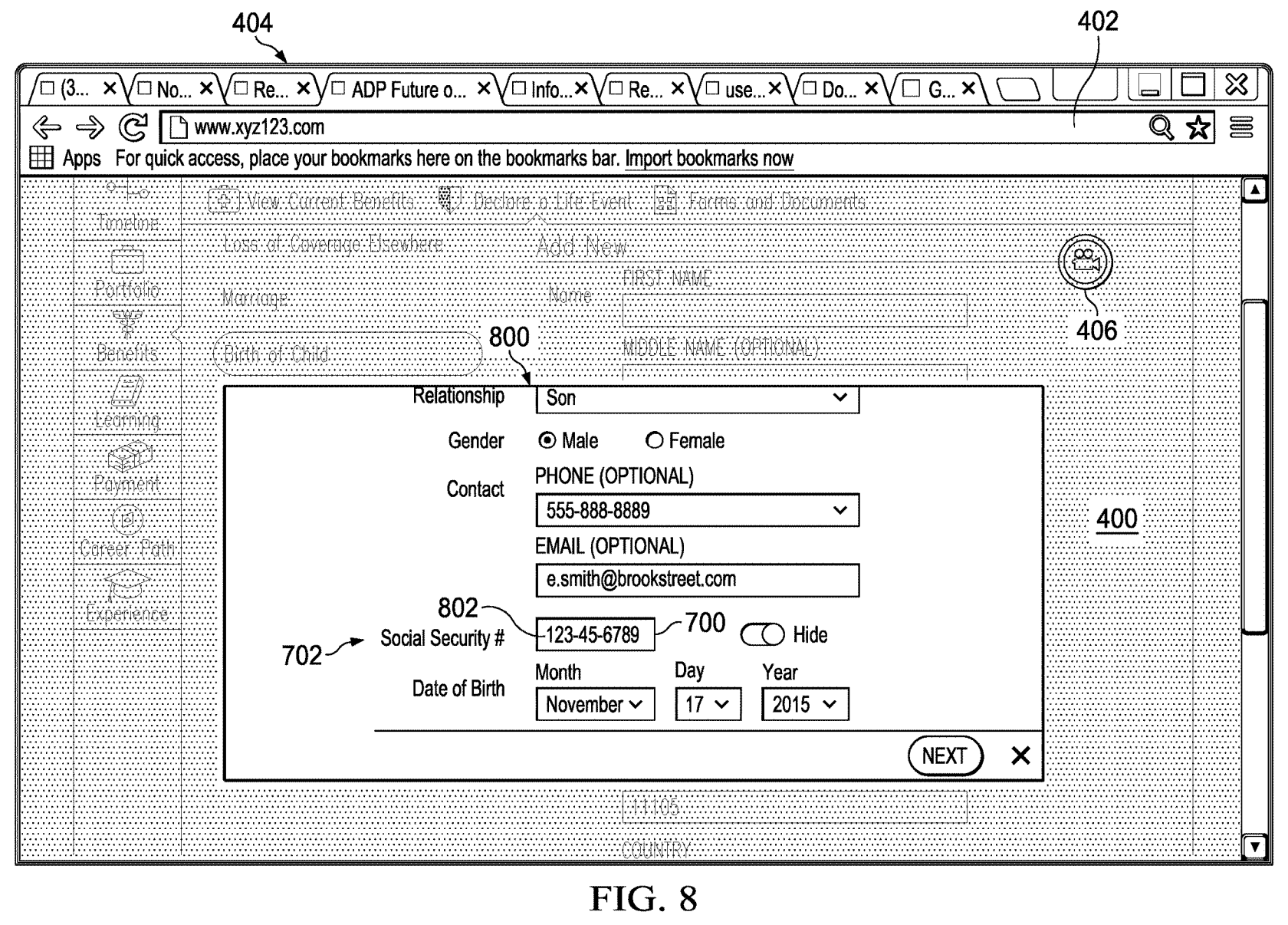

In FIG. 8, an illustration of assistance for an application is depicted in accordance with an illustrative embodiment. As depicted, window 800 is displayed over web page 400. Window 800 is an example of graphical element 150 shown in block form in FIG. 1. Window 800 is generated by an assistance manager, such as assistance manager 140 shown in block form in FIG. 1.

Window 800 displays animation 802, which is an example of a group of graphical indicators that provides visual assistance for the location of text box 700 in the section called "Social Security #" 702. In the illustrative example, animation 802 includes progressively displaying "123-45-6789" in text box 700. Visual assistance is animation 802 in this illustrative example. In addition to the visual assistance through animation 802, audio assistance is also presented in the form of verbal instructions describing text box 700 and how to enter information into text box 700.

For example, in "Social Security #" 702, if the child does not yet have a security number, animation 802 displayed in window 800 shows "123-45-6789" entered into text box 700 in "Social Security #" 702. In this illustrative example, animation 802 may display "1" then "12", "123", "123-", "123-4", "123-45", "123-45-", "123-45-6", "123-45-67", "123-45-678", and then finally "123-45-6789" to draw the attention of the user to the information that may be entered into text box 700.

Additionally, the verbal instructions may be presented from an audio file that state that the number shown in text box 700 may be used until an actual Social Security number is obtained. The verbal instructions may then let the user know that the user may return to add the actual Social Security number when it is received.

Figure 9:
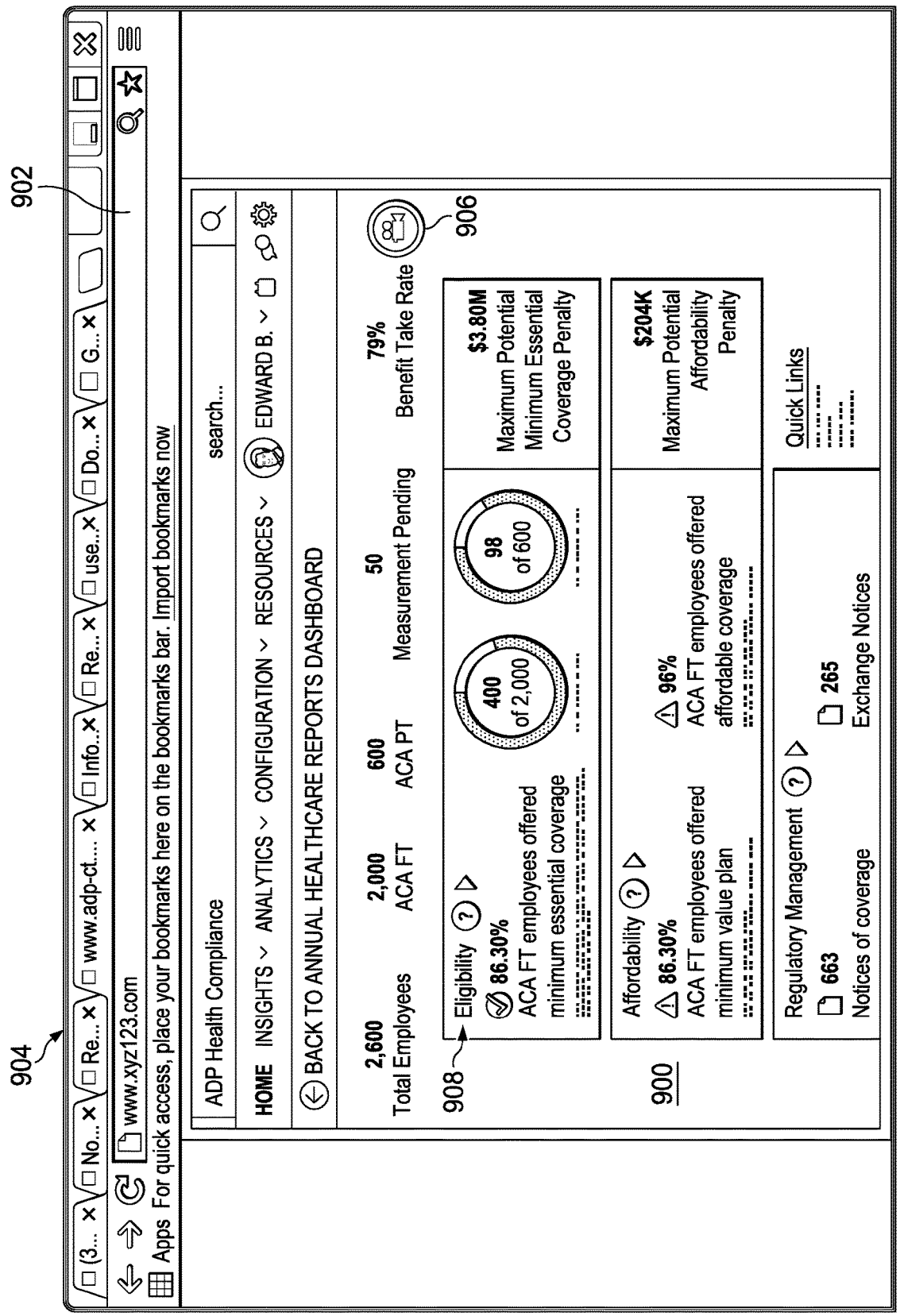
FIG. 9 is an illustration of assistance for an application in accordance with an illustrative embodiment.

With reference to FIGS. 9-14, illustrations of a process for obtaining assistance for an application are depicted in accordance with illustrative embodiments. FIG. 9 is an illustration of an application depicted in accordance with an illustrative embodiment.

As depicted, web page 900 is for application 902 in web browser 904. Application 902 is a benefits management application in this illustrative example. Web page 900, application 902, and web browser 904 are graphical representations of software and information for web page 136, application 118, and web browser 120 shown in block form in FIG. 1. These graphical representations may be generated by these components and displayed in display system 124 for client device 116 shown in block form in FIG. 1 in this illustrative example.

In this illustrative example, help indicator 906 is displayed on web page 900. As depicted, the location for assistance in this example is the section called "Eligibility" 908. The selection of help indicator 906 provides assistance for this location in web page 900 for application 902.

Figure 10:
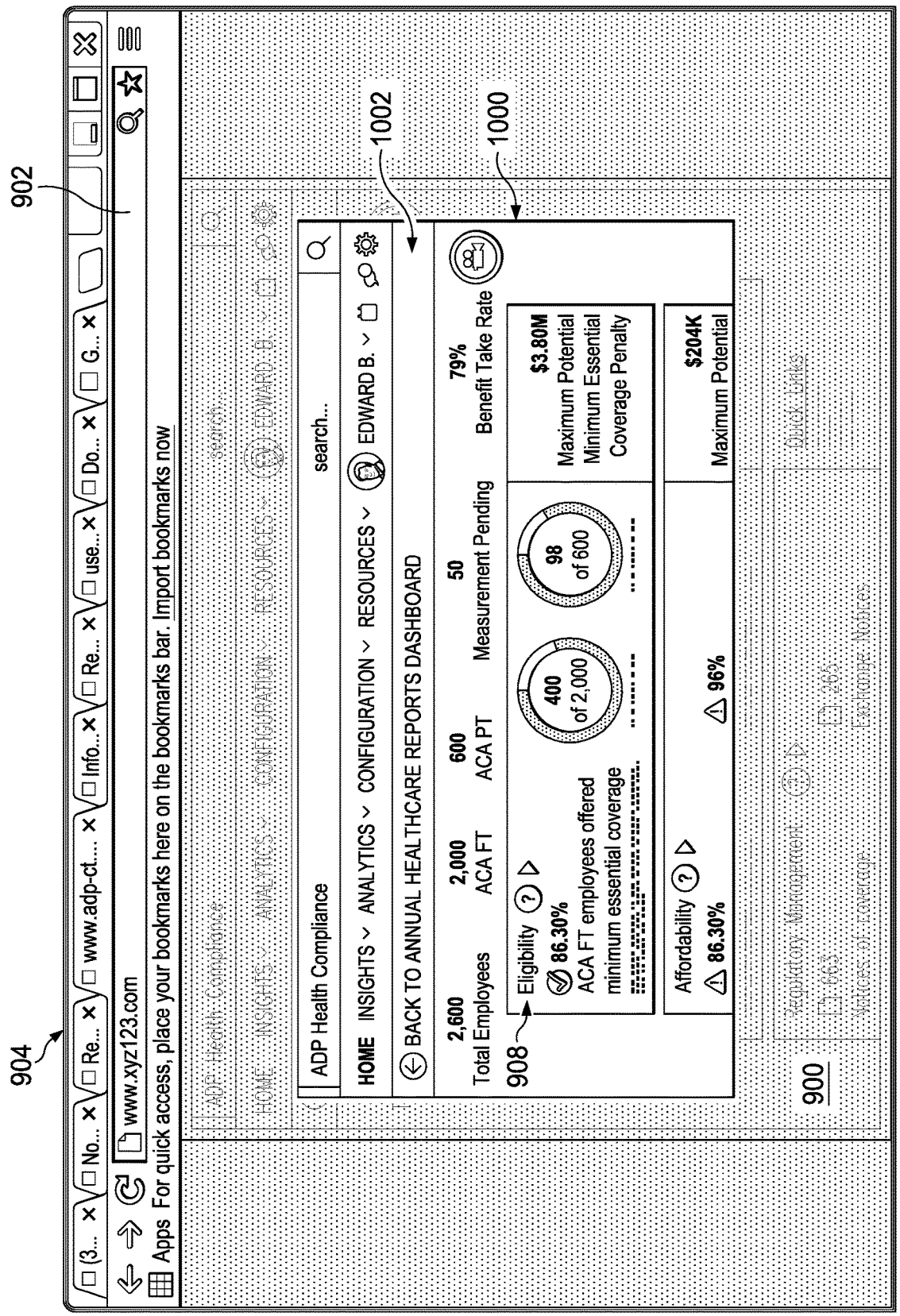
FIG. 10 is an illustration of assistance for an application in accordance with an illustrative embodiment.

In FIG. 10, an illustration of assistance for an application is depicted in accordance with an illustrative embodiment. As depicted, window 1000 is displayed over web page 900. Window 1000 displays portion 1002 of web page 900 in which window 1000 with portion 1002 provides visual assistance. Window 1000 with portion 1002 may focus the attention of the user to a particular location. Additionally, audio assistance may be presented in conjunction with the display of portion 1002 of web page 900 in window 1000. The audio assistance may be verbal instructions about how to use the section called "Eligibility" 908 as displayed in portion 1002 of web page 900 in window 1000. In this manner, window 1000 may focus the attention of the user to portion 1002 while the audio assistance may be presented to provide information about how to use application 902 at the location in portion 1002 of web page 900 displayed in window 1000.

Figure 11:
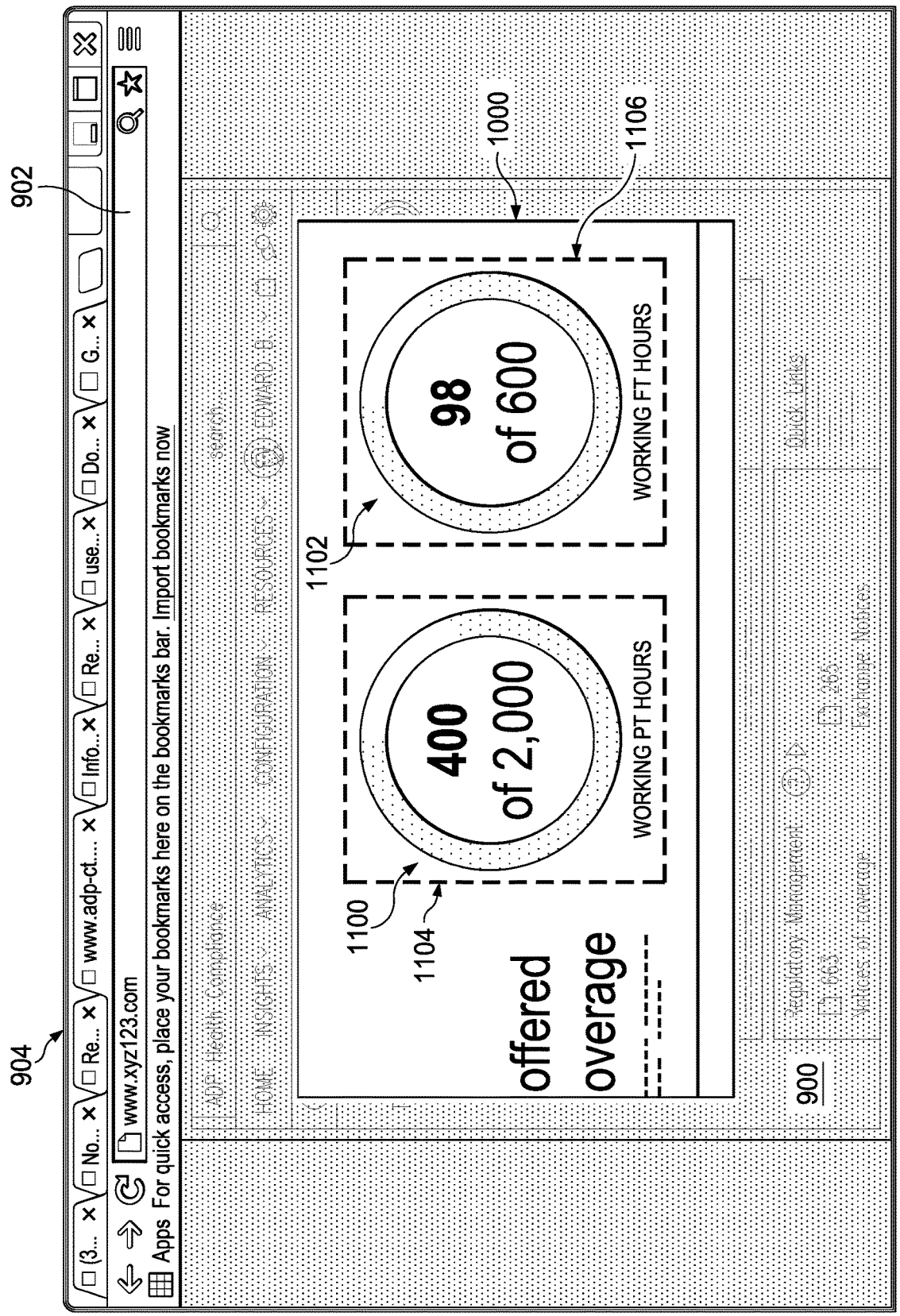
FIG. 11 is an illustration of assistance for an application in accordance with an illustrative embodiment.

Turning next to FIG. 11, an illustration of assistance for an application is depicted in accordance with an illustrative embodiment. As depicted, window 1000 has zoomed in and panned to "Working PT Hours" 1100 and "Working FT Hours" 1102 in "Eligibility" 908 shown in FIGS. 9 and 10.

The controls, "Working PT Hours" 1100 and "Working FT Hours" 1102 may include highlighting 1104 and highlighting 1106. In this illustrative example, highlighting 1104 and highlighting 1106 may be displayed one at a time as the audio assistance describes what "Working PT Hours" 1100 and "Working FT Hours" 1102 are used for. For example, "Working PT Hours" 1100 may have highlighting 1104 while the audio assistance describes "Working PT Hours" 1100. Then, "Working FT Hours" 1102 may have highlighting 1106 as the audio assistance describes "Working FT Hours" 1102.

Figure 12:
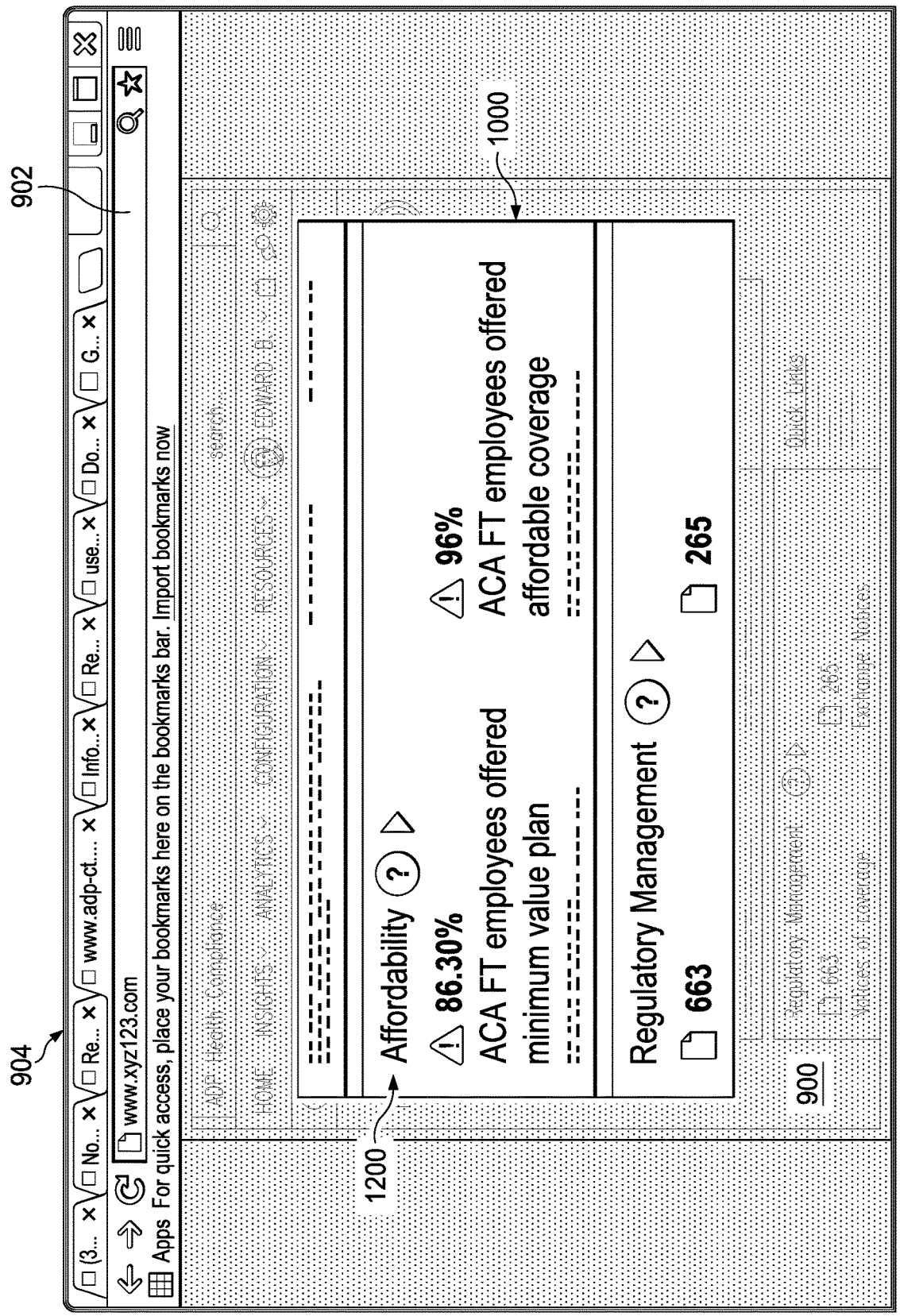
FIG. 12 is an illustration of assistance for an application in accordance with an illustrative embodiment.

Turning next to FIG. 12, an illustration of assistance for an application is depicted in accordance with an illustrative embodiment. In this example, window 1000 pans to "Affordability" 1200. In this manner, the attention of the user is drawn to this particular portion of web page 900. In this example, the audio assistance provides a description of the different numbers in "Affordability" 1200. In particular, the assistance manager may use the information on web page 900 to describe what the numbers for the user actually mean. In this example, the numbers in "Affordability" 1200 show that the company does not meet the standards for affordable coverage. The audio assistance may also provide this description and what actions may be needed.

Figure 13:
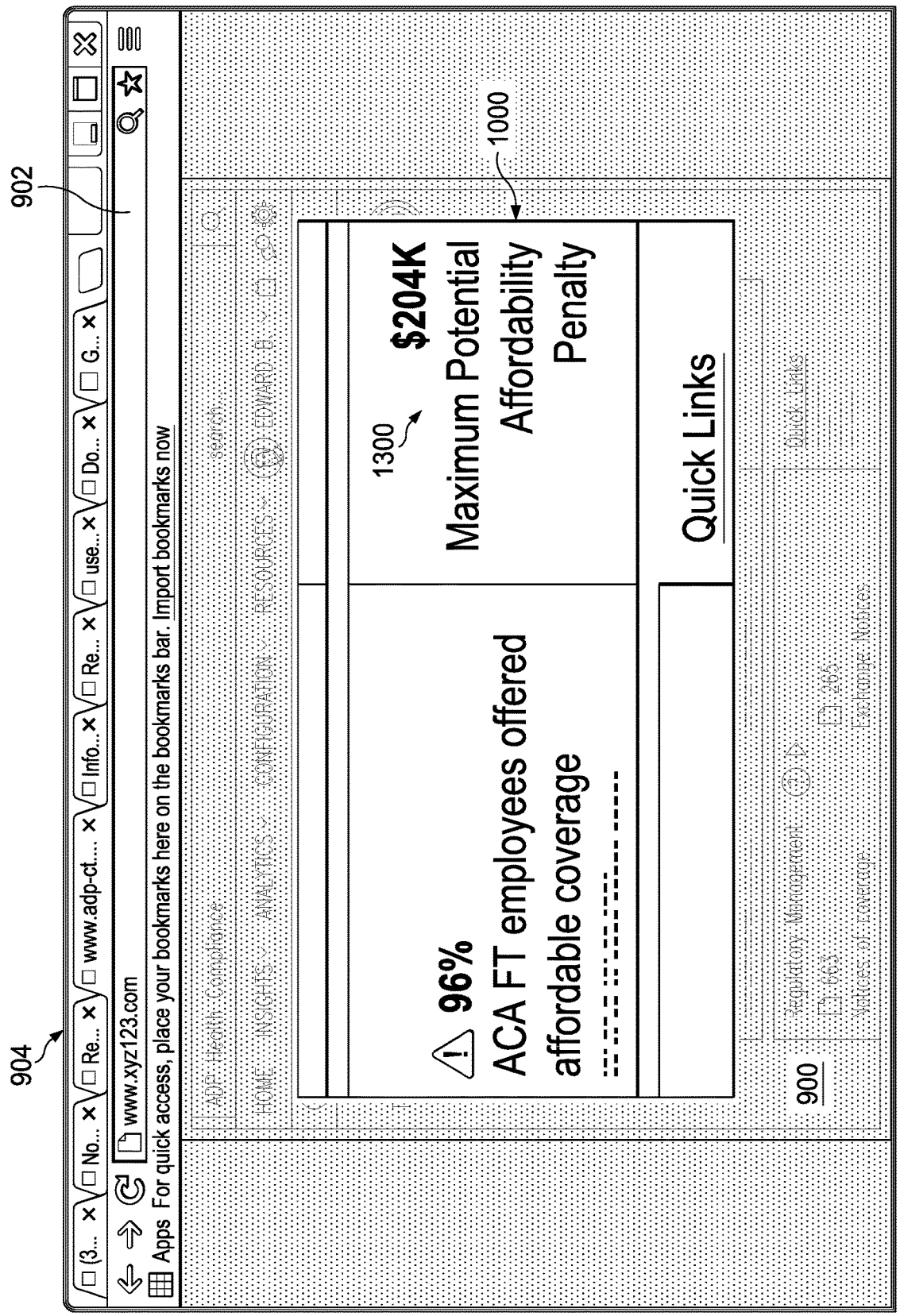
FIG. 13 is an illustration of assistance for an application in accordance with an illustrative embodiment.

With reference to FIG. 13, an illustration of assistance for an application is depicted in accordance with an illustrative embodiment. In this example, window 1000 pans to the section entitled "Penalty" 1300. The audio assistance may describe the potential penalty shown in "Penalty" 1300.

The illustration of web pages and assistance provided for the applications in FIGS. 4-8 and FIGS. 9-13 are not meant to limit the manner in which other illustrative examples may be implemented. These figures are examples of some implementations for providing assistance 142 through assistance manager 140 shown in block form in FIG. 1.

In the examples in FIGS. 4-8 and FIGS. 9-13, the user initiates the assistance by selecting help indicators. In other illustrative examples, the assistance may be started automatically without requiring the user to initiate the assistance of help indicators. In still other illustrative examples, the location and assistance may be provided for a page or screen on a native application, instead of a web page for a web application.

Figure 14:
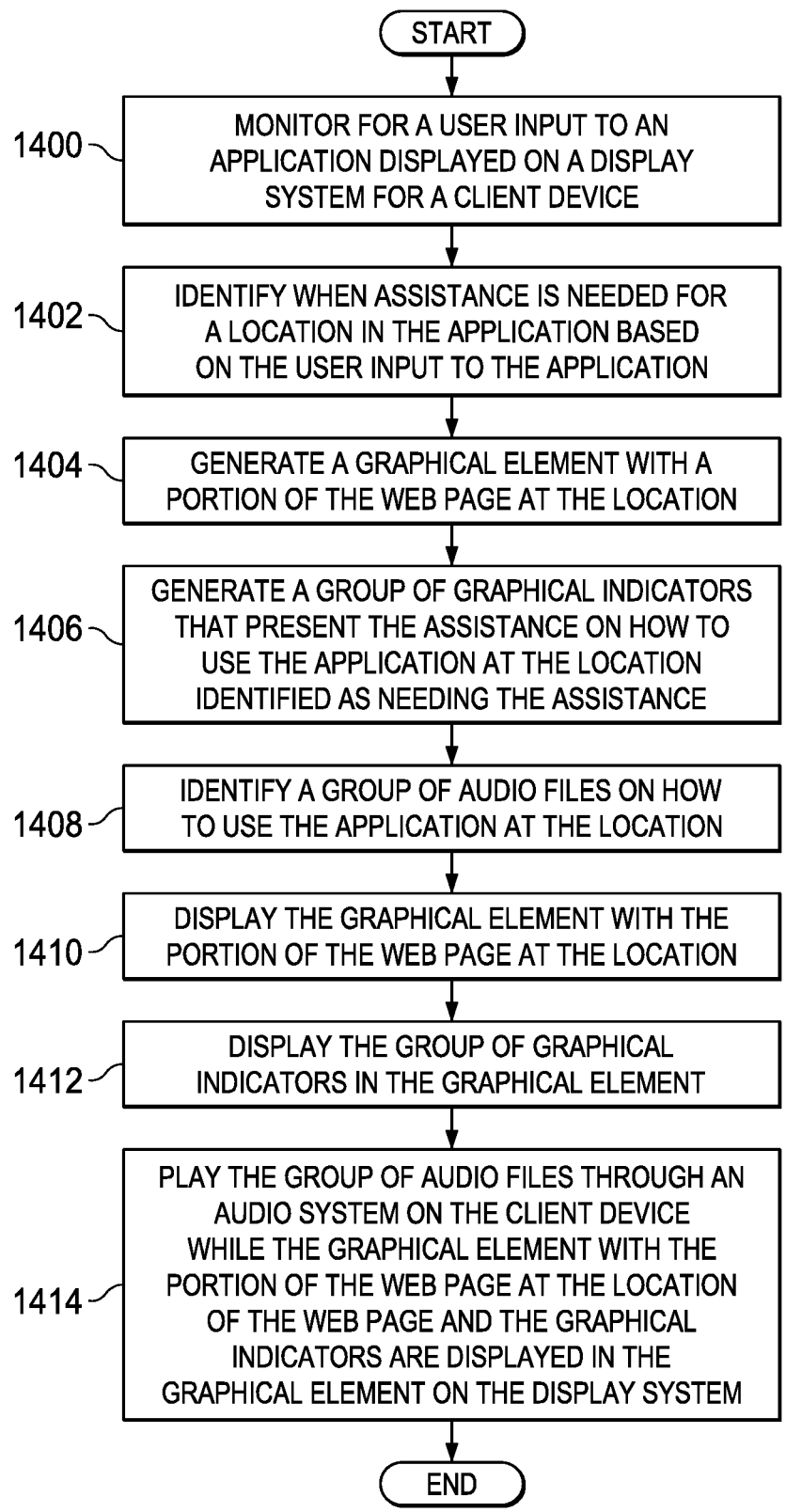
FIG. 14 is a flowchart of a process for providing assistance for an application in accordance with an illustrative embodiment.

With reference now to FIG. 14, a flowchart of a process for providing assistance for an application is depicted in accordance with an illustrative embodiment. The process depicted in this flowchart may be implemented in assistance manager 140 in computer system 108 shown in block form in FIG. 1.

The process begins by monitoring for a user input to an application displayed on a display system for a client device (step 1400). The process identifies when assistance is needed for a location in the application based on the user input to the application (step 1402).

The process generates a graphical element with a portion of the web page at the location (step 1404). In other words, the portion of the web page includes the location at which the assistance has been identified as being needed. The graphical element focuses the attention of the user to the location in the application.

The process generates a group of graphical indicators that present the assistance on how to use the application at the location identified as needing the assistance (step 1406). The group of graphical indicators may be based on the user input. The group of graphical indicators may include text based on user input. For example, the group of graphical indicators may include information entered by the user through the user input. The group of graphical indicators may show corrections to the information entered. For example, the group of graphical indicators may display a required format to the user input entered.

The process identifies a group of audio files on how to use the application at the location (step 1408). The process displays the graphical element with the portion of the web page at the location (step 1410). The process also displays the group of graphical indicators in the graphical element (step 1412). The process then plays the group of audio files through an audio system on the client device while the graphical element with the portion of the web page at the location of the web page and the graphical indicators are displayed in the graphical element on the display system (step 1414) with the process terminating thereafter. In this manner, the assistance is provided by the graphical element with the portion of the web page at the location, the animation, and the presentation of the audio file.

Figure 15:
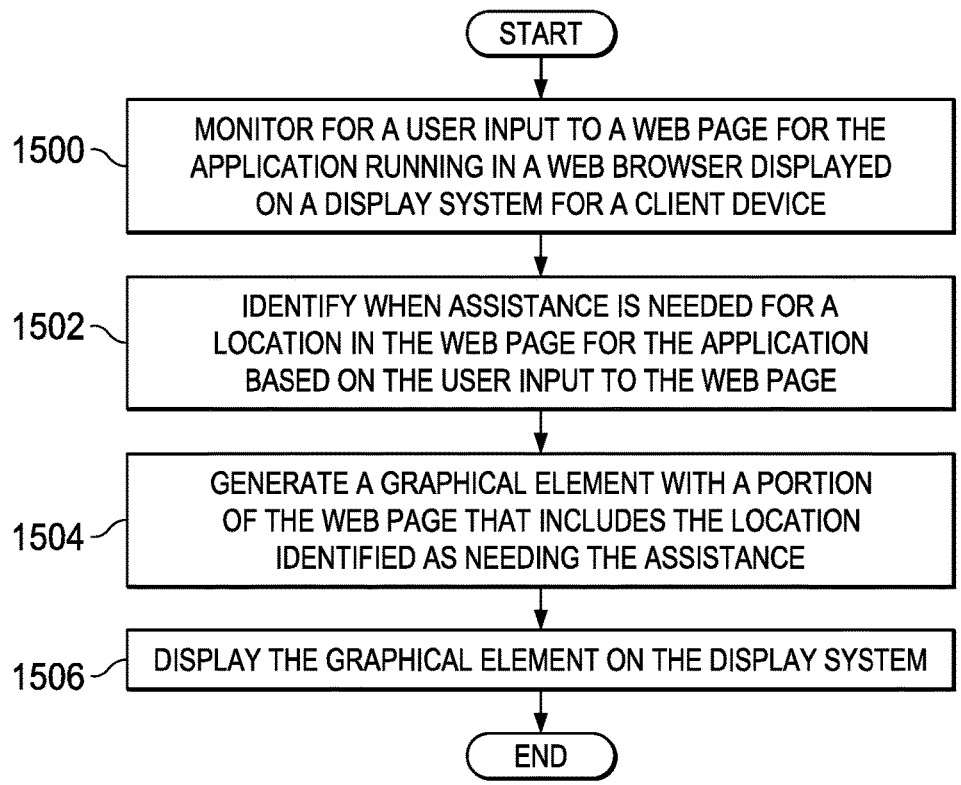
FIG. 15 is a flowchart of a process for providing assistance for a web application in accordance with an illustrative embodiment.

With reference now to FIG. 15, a flowchart of a process for providing assistance for a web application is depicted in accordance with an illustrative embodiment. The process depicted in this flowchart may be implemented in assistance manager 140 in computer system 108 to provide assistance for web application 132 shown in block form in FIG. 1.

The process begins by monitoring for a user input to a web page for the application running in a web browser displayed on a display system for a client device (step 1500). For example, the process may monitor document object model events for at least one of mouse events, keyboard events, user interface events, or hypertext markup language events. These events may be generated in response to user input to the web page.

The process identifies when assistance is needed for a location in the web page for the application based on the user input to the web page (step 1502). For example, in step 1502, the user may have selected a text box, a drop-down menu, or some other element in the web page. If the user input entering information does not occur at the location after some period of time, then a determination is made that assistance is needed at that location. As another example, if the user input is entered incorrectly more than a threshold number of times, a determination may also be made that assistance is needed for that location.

The process generates a graphical element with a portion of the web page that includes the location identified as needing the assistance (step 1504). For example, the graphical element may also include a group of graphical indicators that draw the attention of the user to the location. Further, the graphical indicators also may include information to provide the assistance on how to use the application at the location based on the user input.

The process displays the graphical element on the display system (step 1506) with the process terminating thereafter. The assistance is provided by the graphical element. In some illustrative examples, audio also may be included to provide assistance, depending on the implementation.

Figure 16:
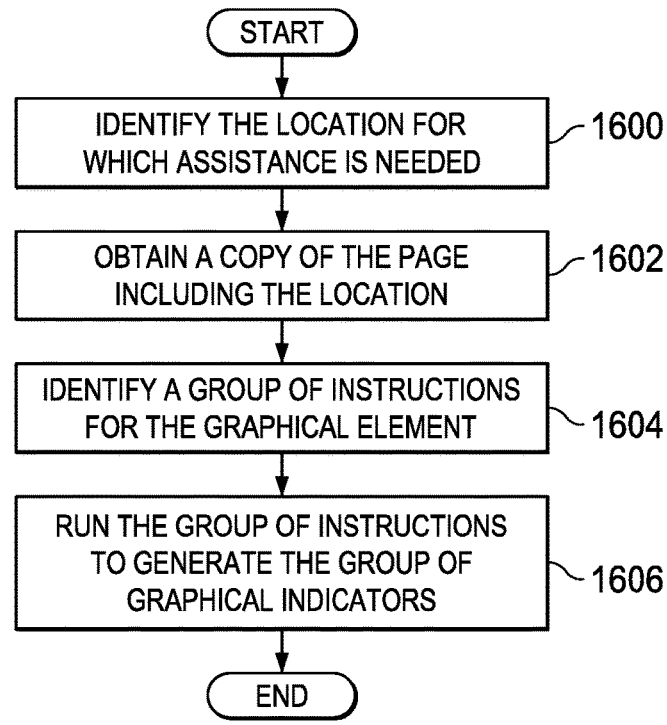
FIG. 16 is a flowchart of a process for generating a graphical element in accordance with an illustrative embodiment.

With reference now to FIG. 16, a flowchart of a process for generating a graphical element is depicted in accordance with an illustrative embodiment. The process illustrated in FIG. 3 is an example of an implementation for step 1404 in FIG. 14 and step 1504 in FIG. 15.

The process identifies the location for which assistance is needed (step 1600). The location may be identified based on the selection of the help indicator, the user input indicating the focus, where the user is in the application, or in some other suitable manner.

The process obtains a copy of the page including the location (step 1602). The page may be a web page or some other type of page displayed in an application. As depicted, the copy is the markup language, instructions, or other information that is used to display the page. In the illustrative example, a screenshot of the page is unnecessary.

The process then identifies a group of instructions for the graphical element (step 1604). The group of instructions may be program code, such as JavaScript, that has been previously generated to provide assistance for the location. These instructions may be, for example, instructions to display a window or other type of graphical element with the portion of the web page. Additionally, instructions also may include the group of graphical indicators that are displayed in the graphical elements with the portion of the web page. The group of graphical indicators may include at least one of highlighting, bolding, animations, text, icons, images, or other suitable types of graphical indicators. The graphical indicators may be displayed at different times for the same location, depending on instructions generated. Further, the graphical element can pan or zoom when presenting the portion of the web page. For example, only part of the portion of the web page may be initially displayed with the graphical element panning to different parts. In another example, part of the portion of the web page may be magnified to bring attention to a location in the portion of the web page.

The process then runs the group of instructions to generate the group of graphical indicators (step 1606) with the process terminating thereafter. The group of instructions uses at least a portion of the web page for the animation in this illustrative example. Additionally, the group of instructions may also use information entered by the user input. For example, a name, a Social Security number, an address, a selection of a gender, a start date, or other suitable information may be entered into the web page by user input at the time when a determination is made that assistance is needed for the location. This information may be part of the group of graphical indicators displayed in to provide assistance.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in the flowchart in FIG. 14, assistance may only take the form of an animation, rather than also including an audio file. As another example, the process in the flowchart illustrated in FIG. 15 may include identifying and playing an audio file to provide assistance to the user as both visual assistance and audio assistance.

Figure 17:
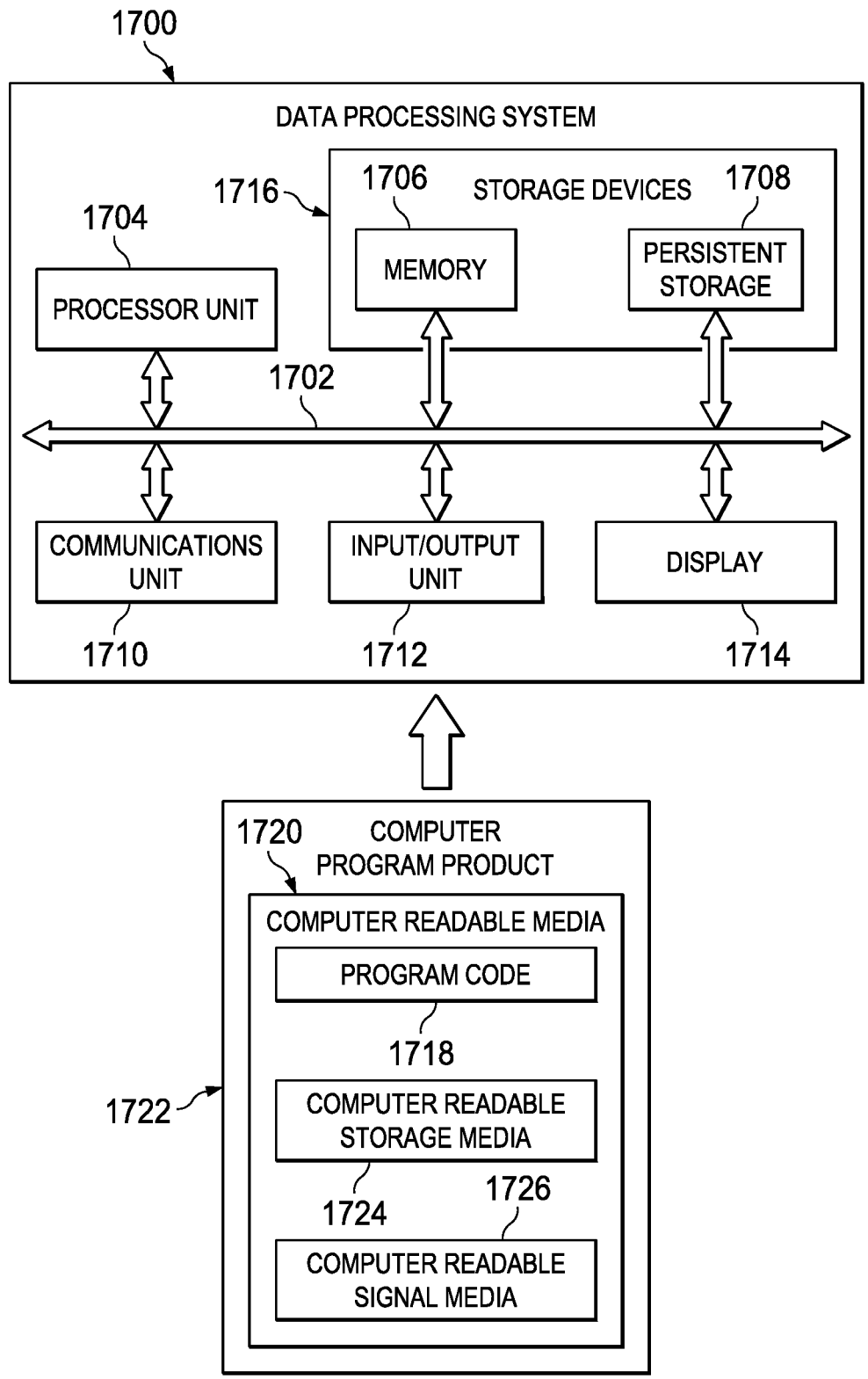
FIG. 17 is a block diagram of a data processing system in accordance with an illustrative embodiment.

Turning now to FIG. 17, a block diagram of a data processing system is depicted in accordance with an illustrative embodiment. Data processing system 1700 may be used to implement one or more data processing systems in computer system 108 and client devices 110 shown in block form in FIG. 1. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or on both a temporary basis and a permanent basis. Storage devices 1716 may also be referred to as computer readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid state hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these illustrative examples. In one example, computer readable media 1720 may be computer readable storage media 1724 or computer readable signal media 1726. In these illustrative examples, computer readable storage media 1724 is a physical or tangible storage device used to store program code 1718 rather than a medium that propagates or transmits program code 1718.

Alternatively, program code 1718 may be transferred to data processing system 1700 using computer readable signal media 1726. Computer readable signal media 1726 may be, for example, a propagated data signal containing program code 1718. For example, computer readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

Thus, the illustrative embodiments provide a method and apparatus for providing assistance to a user of an application. In the illustrative examples, the assistance is online assistance that is provided by an assistance manager. The assistance manager may include one or more components that are located on the client to detect when assistance is needed for an application. One or more other components are located on a remote data processing system, such as a server computer on a computer system. The other components generate at least one of visual assistance or audio assistance.

Additionally, in the list of examples, the assistance is provided for a particular location that is identified based on the user input. For example, the user may select the help indicator at a location where the user is having difficulty. The help indicator may always be present on the web page or displayed when the assistance manager determines that the user needs assistance with the location. In another illustrative example, assistance may be presented without requiring the user to select the help indicator.

Additionally, visual assistance may include an animation that may be based on the web page with the location needing assistance. The animation also may be based on information entered into the web page.

The descriptions of the different illustrative embodiments have been presented for purposes of illustration and description, and are not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing assistance for an application, the method comprising:
    monitoring, by a computer system, for a user input to a web page for the application running in a web browser displayed on a display system for a client device;
    identifying, by the computer system, when the assistance is needed for a location in the web page for the application according to a policy that defines when assistance is needed for the location;
    generating, by the computer system, a graphical element comprising a copy of a portion of the web page at the location, the copy of the portion of the web page comprising a different graphical element than the web page, the copy of the portion of the web page comprising markup language used to display the web page;
    identifying, by the computer system, a group of audio files on how to use the application at the location;
    displaying, by the computer system, the graphical element with the copy of the portion of the web page at the location on the display system, wherein the displaying is performed in a manner to accentuate the graphical element such that attention of a user is focused on the graphical element; and
    playing, by the computer system, an audio file of the group of audio files on the client device while the graphical element with the copy of the portion of the web page at the location of the web page is displayed on the display system, wherein the audio file and the graphical element with the copy of the portion of the web page at the location provide the assistance.

2. The method of claim 1 further comprising the computer system:
    generating a group of graphical indicators that presents the assistance on how to use the application at the location identified as needing the assistance; and
    displaying the group of graphical indicators in the graphical element in the web page for the application on the display system.

3. The method of claim 1, wherein the graphical element and the audio file provide the assistance in a form of instructions on how the user input should be made to the location.

4. The method of claim 1, wherein generating the graphical element with the copy of the portion of the web page at the location comprises:
    identifying a group of instructions for displaying a modal window and the copy of the portion of the web page within the modal window.

5. The method of claim 4 further comprising the computer system:
    creating the group of instructions using a visual programming language.

6. The method of claim 1, wherein monitoring the web page in the application running in the web browser displayed in the display system for the client device for the user input comprises:
    monitoring document object model events for at least one of mouse events, keyboard events, user interface events, or hypertext markup language events.

7. The method of claim 1, wherein displaying the graphical element in the web browser for the application on the display system comprises:
    displaying a help indicator, wherein the help indicator indicates that the assistance is available for the location; and displaying the graphical element with the copy of the portion of the web page when the help indicator is selected.

8. The method of claim 1, wherein the location includes at least one of a text box, a check box, or a drop-down menu.

9. The method of claim 1, wherein the graphical element is selected from one of a window, a tooltip, a pop-up window, a modal window, and an in-line element.

10. The method of claim 1, wherein the application is selected from one of an accounting application, a human resources application, a benefits administration program, and a database application.

11. The method of claim 1, wherein the client device is selected from one of a personal computer, a workstation, a kiosk, a laptop computer, a mobile phone, a tablet computer, and a game console.

12. The method of claim 1, wherein the graphical element includes at least one of highlighting, an icon, underlining, bolding, italics, a font size, a font type, or flashing text to focus user attention on the graphical element.

13. The method of claim 1, wherein at least one of panning or moving the graphical element is used to bring user attention to the graphical element.

14. The method of claim 1, wherein the policy comprises at least one of:
a threshold number of times an incorrect user input occurs; or
a threshold amount of time for an absence of user input.

15. A computer system comprising:
at least one processor coupled to memory elements having program code stored thereon, the at least one processor executing the program code to cause the at least one processor to:
monitor, by an assistance manager, for a user input to a web page for an application running in a web browser displayed on a display system for a client device;
identify when assistance is needed for a location in the web page for the application according to a policy that defines when assistance is needed for the location;
generate a copy of a portion of the web page and information entered into the web page;
generate a graphical element comprising the copy of the portion of the web page at the location;
identify a group of audio files on how to use the application at the location;
display the graphical element with the copy of the portion of the web page at the location on the display system, wherein display of the copy of the portion of the web page is separately displayed from display of the web page; and
play an audio file of the group of audio files on the client device while the graphical element with the copy of the portion of the web page at the location of the web page is displayed on the display system, wherein:
the audio file and the graphical element with the copy of the portion of the web page at the location provide the assistance; and
the graphical element is displayed in an accentuated manner such that an attention of a user is focused on the graphical element.

16. The computer system of claim 15, wherein the assistance manager generates a group of graphical indicators that presents the assistance on how to use the application at the location identified as needing the assistance and displays the group of graphical indicators in the graphical element in the web page for the application on the display system.

17. The computer system of claim 16, wherein the graphical element and the audio file provide the assistance in a form of instructions on how the user input should be made to the location.

18. The computer system of claim 15, wherein in generating the graphical element with the copy of the portion of the web page at the location, the assistance manager identifies a group of instructions for displaying a modal window and the copy of the portion of the web page within the modal window.

19. The computer system of claim 18, wherein the assistance manager creates the group of instructions using a visual programming language.

20. The computer system of claim 15, wherein in monitoring for the user input to the web page for the application running in the web browser displayed on the display system for the client device, the assistance manager monitors document object model events for at least one of mouse events, keyboard events, user interface events, or hypertext markup language events.

21. The computer system of claim 15, wherein in displaying the graphical element in the web browser for the application on the display system, the assistance manager displays a help indicator in association with the location, wherein the help indicator indicates that assistance is available for the location and displays the graphical element with the copy of the portion of the web page when the help indicator is selected.

22. The computer system of claim 15, wherein the location includes at least one of a text box, a check box, or a drop-down menu.

23. The computer system of claim 15, wherein the graphical element is selected from one of a window, a tooltip, a pop-up window, a modal window, and an in-line element.

24. The computer system of claim 15, wherein the application is selected from one of an accounting application, a human resources application, a benefits administration program, and a database application.

25. The computer system of claim 15, wherein the client device is selected from one of a personal computer, a workstation, a kiosk, a laptop computer, a mobile phone, a tablet computer, and a game console.

26. A computer program product for providing assistance for an application, the computer program product comprising:
a non-transitory computer readable storage; medium storing:
first program code for monitoring for a user input to a web page for the application running in a web browser displayed on a display system for a client device;
second program code for identifying when the assistance is needed for a location in the web page for the application according to a policy that defines when assistance is needed for the location;
third program code for generating a graphical element comprising a copy of a portion of the web page at the location, the copy of the portion of the web page obtained from a document object model that organizes content of the web page into nodes, the document object model comprising information entered into the web page;
fourth program code for identifying a group of audio files on how to use the application at the location;

fifth program code for displaying the graphical element with the copy of the portion of the web page at the location on the display system, wherein the fifth program code includes instructions to accentuate the display of the graphical element such that an attention of a user is focused on the graphical element; and sixth program code for playing an audio file of the group of audio files on the client device while the graphical element with the copy of the portion of the web page at the location of the web page is displayed on the display system, wherein the audio file and the graphical element with the copy of the portion of the web page at the location provide the assistance.

27. The computer program product of claim 26 further comprising the non-transitory computer readable storage medium storing:

seventh program code for generating a group of graphical indicators that presents the assistance on how to use the application at the location identified as needing the assistance; and eighth program code for displaying the group of graphical indicators in the graphical element in the web page for the application on the display system.

28. The computer program product of claim 26, wherein the graphical element and the audio file provide the assistance in a form of instructions on how the user input should be made to the location.

29. The computer program product of claim 26, wherein the third program code comprises: program code for identifying a group of instructions for displaying a modal window and the copy of the portion of the web page within the modal window.

30. The computer program product of claim 26, wherein the first program code comprises: program code monitoring document object model events for at least one of a mouse event, a keyboard event, a touchscreen event, or a device event.

31. A method for providing assistance for an application, the method comprising:

monitoring, by a computer system, for a user input to the application running displayed on a display system for a client device;

identifying, by the computer system, when the assistance is needed for a location in the application according to a policy and based on the user input to the application;

generating, by the computer system, an animation that presents the assistance on how to use the application at the location identified as needing the assistance, wherein a graphical element of the animation comprises a copy of a portion of a graphical user interface of the application, the copy of the portion of the graphical user interface consisting essentially of markup language or other instructions such that a screenshot of the portion of the graphical user interface is not used to display the copy of the portion of the graphical user interface; and displaying, by the computer system, the animation in a window for the application on the display system, wherein the assistance is provided by the animation, wherein the displaying the animation is performed in a manner to accentuate the animation such that attention of a user is focused on the animation.

\* \* \* \* \*